(12) United States Patent
Berbee et al.

(10) Patent No.: US 10,465,024 B2
(45) Date of Patent: Nov. 5, 2019

(54) PROCESS TO MAKE TUBULAR ETHYLENE BASED POLYMERS WITH HIGH MELT STRENGTH

(71) Applicant: Dow Global Technologies LLC, Midland, MI (US)

(72) Inventors: Otto J. Berbee, Terneuzen (NL); Stefan Hinrichs, Terneuzen (NL); Sean W. Ewart, Freeport, TX (US); John O. Osby, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 17 days.

(21) Appl. No.: 15/736,896

(22) PCT Filed: Jun. 24, 2016

(86) PCT No.: PCT/US2016/039328
§ 371 (c)(1),
(2) Date: Dec. 15, 2017

(87) PCT Pub. No.: WO2016/210308
PCT Pub. Date: Dec. 29, 2016

(65) Prior Publication Data
US 2018/0171046 A1    Jun. 21, 2018

Related U.S. Application Data

(60) Provisional application No. 62/184,590, filed on Jun. 25, 2015.

(51) Int. Cl.
*C08F 210/02* (2006.01)
*C08F 110/02* (2006.01)
(Continued)

(52) U.S. Cl.
CPC ............ *C08F 210/02* (2013.01); *C08F 2/001* (2013.01); *C08F 2/01* (2013.01); *C08F 2/38* (2013.01);
(Continued)

(58) Field of Classification Search
USPC ................................................ 526/65, 352.2
See application file for complete search history.

(56) References Cited

U.S. PATENT DOCUMENTS

| 3,334,081 A | 8/1967 | Madgwick et al. |
| 3,654,253 A | 4/1972 | Steigerwald et al. |

(Continued)

FOREIGN PATENT DOCUMENTS

| DE | 276598 A3 | 3/1990 |
| WO | 97/45465 A1 | 12/1997 |

OTHER PUBLICATIONS

Goto, Journal of Applied Polymer Science, Applied Polymer Symposium, vol. 36, Jan. 1, 1981, pp. 21-40.

*Primary Examiner* — Fred M Teskin
(74) *Attorney, Agent, or Firm* — Quarles & Brady LLP

(57) ABSTRACT

A process to form an ethylene-based polymer comprises polymerizing a reaction mixture comprising ethylene, at least one monomeric chain transfer agent, and at least one chain transfer agent system comprising at least one chain transfer agent (CTA) in the presence of at least one free-radical initiator and in a reactor configuration comprising at least two reaction zones, reaction zone 1 and reaction zone i (i≥2), wherein the reaction zone i is downstream from reaction zone 1. The ratio of "the activity of the CTA system of the feed to the first reaction zone" to the "activity of the CTA system of the cumulative feed to the reaction zone i," ($Z_1/Z_i$), is less than or equal to $(0.8-0.2*\log(Cs))$, wherein Cs is from 0.0001 to 10.

20 Claims, 5 Drawing Sheets

(51) Int. Cl.
  *C08F 2/01*    (2006.01)
  *C08F 2/38*    (2006.01)
  *C08F 10/02*   (2006.01)
  *C08K 5/07*    (2006.01)
  *C08K 5/101*   (2006.01)
  *C08F 2/00*    (2006.01)
  *C08F 210/16*  (2006.01)

(52) U.S. Cl.
  CPC ............ *C08F 10/02* (2013.01); *C08F 110/02*
        (2013.01); *C08K 5/07* (2013.01); *C08K 5/101*
           (2013.01); *C08F 210/16* (2013.01); *C08F*
             *2500/11* (2013.01); *Y02P 20/582* (2015.11)

(56) References Cited

U.S. PATENT DOCUMENTS

| | | | |
|---|---|---|---|
| 3,917,577 | A | 11/1975 | Trieschmann et al. |
| 4,916,255 | A | 4/1990 | Kobayashi et al. |
| 5,539,075 | A | 7/1996 | Gustafsson et al. |
| 6,569,962 | B1 | 5/2003 | Zschoch et al. |
| 7,820,776 | B2 | 10/2010 | Neuteboom et al. |
| 2002/0052455 | A1 | 5/2002 | Hogt et al. |
| 2003/0114607 | A1 | 6/2003 | Donck |
| 2004/0214971 | A1 | 10/2004 | Gonioukh et al. |
| 2007/0032614 | A1* | 2/2007 | Goossens ............. B01J 19/2415 526/65 |
| 2008/0242809 | A1 | 10/2008 | Neuteboom et al. |
| 2009/0234082 | A1 | 9/2009 | Neilen et al. |
| 2010/0060244 | A1 | 3/2010 | Kurokawa et al. |
| 2011/0052525 | A1 | 3/2011 | Grunewald et al. |
| 2012/0059469 | A1 | 3/2012 | Myers et al. |
| 2012/0252990 | A1* | 10/2012 | Berbee .................... C08F 10/02 526/64 |
| 2013/0197168 | A1 | 8/2013 | Berbee et al. |
| 2013/0237678 | A1 | 9/2013 | Osby et al. |
| 2013/0295289 | A1 | 11/2013 | Littmann et al. |
| 2013/0333832 | A1 | 12/2013 | Vittorias et al. |
| 2014/0275427 | A1 | 9/2014 | Nummila-Pakarinen et al. |
| 2014/0288257 | A1 | 9/2014 | Zschoch et al. |
| 2014/0316094 | A1 | 10/2014 | Berbee et al. |
| 2014/0316096 | A1 | 10/2014 | Berbee et al. |
| 2015/0031843 | A1 | 1/2015 | Hjertberg et al. |
| 2015/0038655 | A1 | 2/2015 | Magnusson et al. |
| 2015/0073104 | A1 | 3/2015 | Uematsu et al. |
| 2015/0111053 | A1 | 4/2015 | Nummila-Pakarinen et al. |
| 2015/0133616 | A1 | 5/2015 | Sultan et al. |
| 2015/0197590 | A1 | 7/2015 | Osby |
| 2015/0210785 | A1 | 7/2015 | Nummila-Pakarinen et al. |
| 2015/0274856 | A1 | 10/2015 | Berbee et al. |
| 2015/0344599 | A1 | 12/2015 | Osby et al. |
| 2016/0115256 | A1 | 4/2016 | Berbee et al. |
| 2016/0137822 | A1 | 5/2016 | Den Doelder et al. |
| 2017/0166668 | A1 | 6/2017 | Duchateau et al. |

* cited by examiner

PROCESS TO MAKE TUBULAR ETHYLENE BASED POLYMERS WITH HIGH MELT STRENGTH

REFERENCE TO RELATED APPLICATIONS

The present application claims the benefit of U.S. Provisional Application No. 62/184,590, filed on Jun. 25, 2015, and incorporated herein by reference.

BACKGROUND

Conventional low density polyethylene (LDPE) has good processability, but when used in film and/or extrusion coating applications, increased melt strength and high G' is desired. U.S. Pub. 2008/0242809 discloses a process for preparing an ethylene copolymer in a tubular reactor at a peak temp. of 290° C.-350° C. The comonomer is a di- or higher functional (meth)acrylate. WO 2007/110127 discloses an extrusion coating composition comprising an ethylene copolymer. The comonomer is a bifunctional α,ω-alkadiene. WO 97/45465 discloses an unsaturated ethylene copolymer, obtained by the polymerization of ethylene and a diunsaturated comonomer. WO 2012/057975 describes polymers comprising monomeric Chain Transfer Agents (mCTAs). WO 2012/084787 describes simulated tubular reactions, in which bi- and/or higher functional comonomers are used to increase long chain branching (LCB). These bi- and/or higher functional comonomers have at least one "C=C" type group (e.g., a vinyl) and at least one CTA group, by which LCB or T-branches can be formed. WO 2014/003837 discloses an ethylene-based polymer made using an asymmetrical polyene. The impact of the multifunctional components on the final polymer through coupling and/or branching reactions is complex, and depends on the type and reactivity of the functional groups. For a multi- and/or bifunctional component to impact polymer rheology, it is important that (1) at least two functional groups of the component molecule react and (2) effective branches are formed in the polymer. WO2013/059042 describes the use of ethylene and/or CTA feed distribution to broaden MWD and increase melt strength. WO 2013/149699 describes improving the purity and/or stability of non-conjugated double bonds to reduce the conversion in the so-called "zero conversion test," which examines fouling potential of a non-conjugated diene. The drawbacks, like gel formation and process fouling, associated with the use multifunctional components, can be avoided by using mCTAs, which can only form T-branches or LCB, and will not crosslink the polymer (inter- and intramolecular H-branches). However, the use of a mCTA, on a molar base, is less effective than the use of a polyene due to a lower impact of a T-branch vs. an H-branch and the lower reactivity of the CTA functionality of the mCTA. WO2013/149698 describes an inhibitor to prevent premature polymerization at the preheater walls, when applying a non-conjugated diene. WO2013/132011 describes preventing preheating fouling by feeding the non-conjugated diene after preheating the ethylene and before starting the reaction. There is a need for such processes in which a mCTA can be used at lower concentrations to achieve the desired high melt strength for film and coatings, while reducing consumption and polymer residuals. These needs have been met herein.

SUMMARY OF THE INVENTION

In one aspect, the invention provides a process to form an ethylene-based polymer, the process comprising polymerizing a reaction mixture comprising ethylene, at least one mCTA, and at least one CTA system comprising at least one chain transfer agent, wherein the polymerization takes place in the presence of at least one free-radical initiator, and wherein the polymerization takes place in a reactor configuration comprising at least two reaction zones, reaction zone 1 and reaction zone i (i≥2), wherein the reaction zone i is downstream from reaction zone 1, and wherein the ratio of "the activity of the CTA system of the feed to the first reaction zone" to the "activity of the CTA system of the cumulative feed to the reaction zone i," ($Z_1/Z_i$), is ≤(0.8−0.2*log(Cs)), wherein Cs is from 0.0001 to 10. In another aspect, the invention provides a process to form an ethylene-based polymer, the process comprising polymerizing a reaction mixture comprising ethylene, at least one mCTA, and at least one chain transfer agent system comprising at least one chain transfer agent, wherein the polymerization takes place in the presence of at least one free-radical initiator, and wherein the polymerization takes place in a reactor configuration comprising at least two reaction zones, reaction zone 1 and reaction zone i (i≥2), wherein the reaction zone i is downstream from reaction zone 1, and wherein at least one of (A) the chain transfer agent system has a Cs value at 130° C. and 1360 atmosphere of ≤0.020 and/or (B) the ratio of CTA activity in the feeds to the first reaction zone and reaction zone i ($Z_1/Z_i$) is ≤0.90.

DETAILED DESCRIPTION

Figure 1:
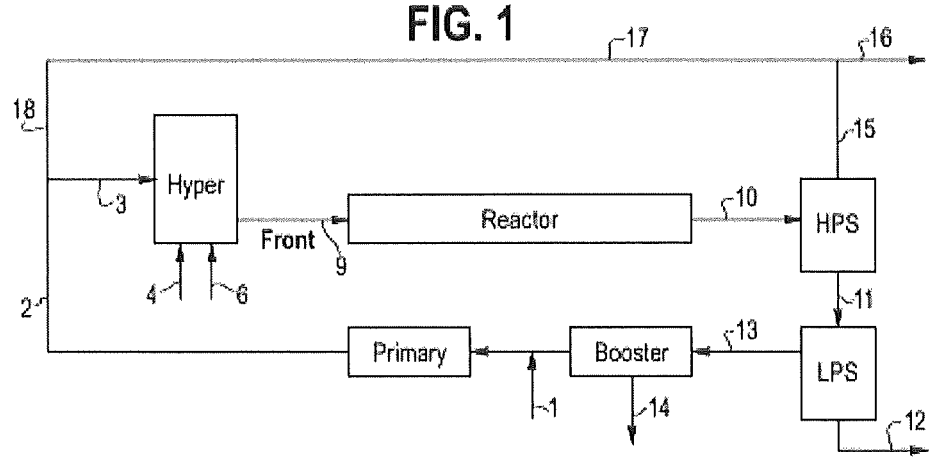
FIG. 1 is a process flow diagram for Comp. Exs. (C.Exs.) 11, 12, 13 and 14 and Inv. Ex. (I.Ex.) 1.

As discussed above, the invention provides processes to form ethylene-based polymers, as discussed above, with increased melt strength through the use of a coupling and/or branching component in combination with a low active CTA system and/or feeding preferentially a higher concentration of CTA to downstream reaction zones. An inventive process may comprise a combination of ≥2 embodiments described herein. mCTAs are compounds which contain both a free radical polymerizable olefinic moiety, as well as a moiety capable of chain transfer (CT) connected by some form of inert linking group. The olefinic moiety is typically more reactive than ethylene in free radical polymerization. A bi- or multifunctional comonomer (mCTA) which has the highest probability of being incorporated into the growing chain (that is, the olefinic moiety of the mCTA), is an acrylate group, a methacrylate group, an amide group or a double bond (WO 2012/084787). In an embodiment, the olefinic moiety is preferably chosen from methacrylates, acrylates or allyl ethers. In a further embodiment, the olefinic moiety is preferable a methacrylate or acrylate. The least one functional group which can act as CTA preferably does not have the highest probability, of the functional groups, of being incorporated into the growing chain. In an embodiment, the CT moiety is preferably an aldehyde group, a ketone group, an alcohol group, or a thiol group. These compounds can be described by the general formulas i) through vi):

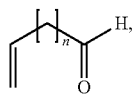
i)

where n is from 2 to 20;

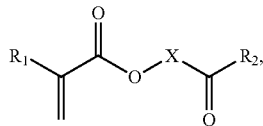
ii)

where $R_1$ and $R_2$ are each independently selected from H or an alkyl; and X is a $C_1$ to $C_{32}$ alkyl chain which is linear or branched;

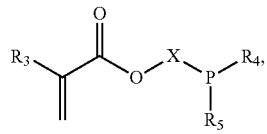
iii)

where $CR_3$, $R_4$ and $R_5$ are each independently selected from H or an alkyl; and X is a $C_3$ to $C_{20}$ alkyl chain which is linear or branched;

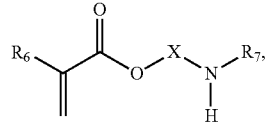
iv)

where $R_6$ and $R_7$ are each independently selected from H or an alkyl; and X is a $C_2$ to $C_{20}$ alkyl chain which is linear or branched;

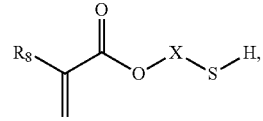
v)

where $R_8$ is selected from H or an alkyl; and X is a $C_2$ to $C_{20}$ alkyl chain which is linear or branched; and

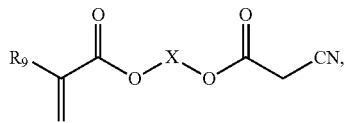
vi)

where $R_9$ is selected from H or an alkyl; and X is a $C_2$ to $C_{20}$ alkyl chain which is linear or branched.

In an embodiment, the mCTA is selected from structures i), ii), iii), iv), v), vi) or combinations thereof. In an embodiment, the mCTA is selected from structures i), ii), iii), iv), v) or vi). In an embodiment, the mCTA is selected from i), ii), vi) or combinations thereof. In an embodiment, mCTA is selected from i), ii) or vi). In an embodiment, the mCTA is i). In an embodiment, the mCTA is ii). In an embodiment, the mCTA is vi). Examples of bifunctional comonomers (mCTAs) are compounds of formula:

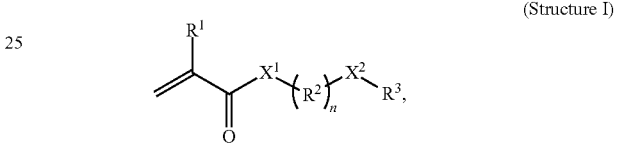
(Structure I)

wherein $R^1$ is methyl or H, $X^1$ is —O— or —NH— and preferably —O—, $R^2$ is —Si(CH$_3$)$_2$—, —CH$_2$—O— or —Si(CH$_3$)$_2$—O—, and preferably —CH$_2$—, n is from 1 to 32, preferably from 1 to 22 and most preferably from 1 to 12, $X^2$ is —C(O)—, —CHOH— or —CHSH—, and preferably —C(O)—, and $R^3$ is an alkyl or H, and preferably methyl or H, and more preferably H, or the unit —$X^2$—$R^3$ is —CH═Cl$_2$. In an embodiment, the mCTA is selected from a) through f):

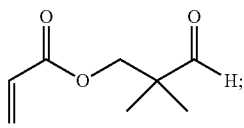
a)

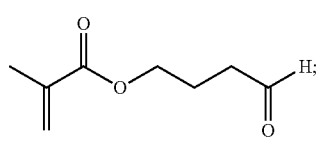
b)

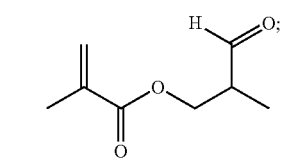
c)

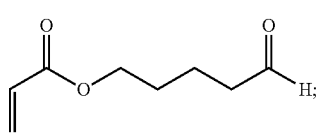
d)

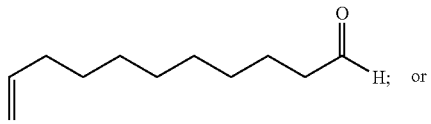

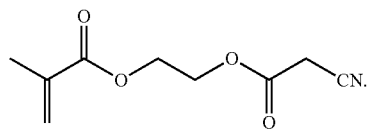

In an embodiment, the mCTA is selected from structures a), b), c), d), e), i) or combinations thereof. In an embodiment, the mCTA is selected from structures a), b), c), d), e) or f). In an embodiment, the mCTA is selected from structures a), b), c), d) or combinations thereof. In an embodiment, the mCTA is selected from structures a), b), c) or d).

Polyenes are compounds which contain ≥2 free radical polymerizable olefinic moieties connected by some form of inert linking group. These compounds can be symmetric (all polymerizable olefin ends (each terminal C=C bond) the same) or asymmetric. Exs. are shown by formulas vii) thru xiii): For symmetrical polyenes, the chemical nature of each terminal C=C double bond is the same, for example, acrylate, methacrylate, vinyl, allyl, etc.

wherein t is from 2 to 20;

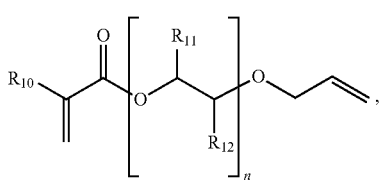

wherein $R_{10}$, $R_{11}$ and $R_{12}$ are each independently selected form H or an alkyl, and n is from 1 to 50;

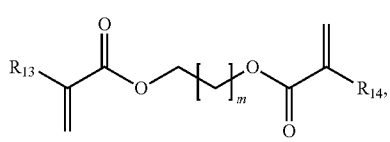

wherein $R_{13}$ and $R_{14}$ are each independently selected form H or an alkyl, and m is from 1 to 50;

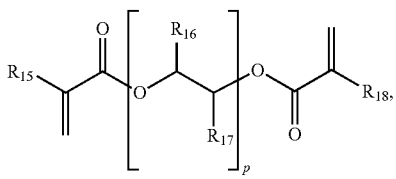

wherein $R_{15}$, $R_{16}$, $R_{17}$ and $R_{18}$ are each independently selected form H or an alkyl, and p is from 1 to 50;

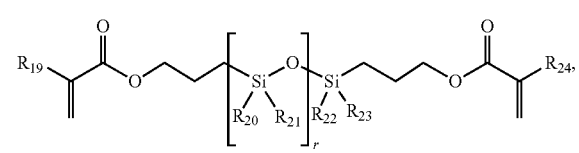

wherein $R_{19}$, $R_{20}$, $R_{21}$, $R_{22}$, $R_{23}$ and $R_{24}$ are each independently selected from H or an alkyl, and r is from 1 to 1000;

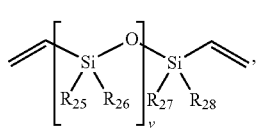

wherein $R_{25}$, $R_{26}$, $R_{27}$ and $R_{28}$ are each independently selected form H or an alkyl, and v is from 1 to 1000; and

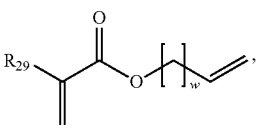

herein $R_{29}$ is H or an alkyl, and w is from 1 to 20. In an embodiment, the polyene is selected from formulas vii), ix), x), or combinations thereof. In an embodiment, the polyene is selected from the formulas vii), ix), or x). In an embodiment, the polyene is a symmetrical polyene selected from structure vii), structure ix) wherein $R_{13}=R_{14}$, structure x) wherein $R_{15}=R_{18}$, structure xi) wherein $R_{19}=R_{24}$, structure xii) or combinations thereof. In an embodiment, the polyene is a symmetrical polyene selected from structure vii), structure ix) wherein $R_{13}=R_{14}$, structure x) wherein $R_{15}=R_{18}$, structure xi) wherein $R_{19}=R_{24}$, or structure xii). In an embodiment, the polyene is a symmetrical polyene selected from structure vii), structure ix) wherein $R_{13}=R_{14}$, or combinations thereof. In an embodiment, the polyene is a symmetrical polyene selected from structure vii) or structure ix) wherein $R_{13}=R_{14}$. In an embodiment, a process includes polymerizing a mixture comprising a symmetrical polyene and an asymmetrical polyene. In a further embodiment, the symm. polyene is selected from structure vii), structure ix) wherein $R_{13}=R_{14}$, structure x) wherein $R_{15}=R_{18}$, structure v) wherein $R_{19}=R_{24}$, or structure xii); and the asymm. polyene is selected from structure viii), structure ix) wherein $R_{13}\neq R_{14}$, structure x) wherein $R_{15} \neq R_{18}$, structure xi) wherein $R_{19} \neq R_{24}$, structure xii), or structure xiii), wherein structures vii) through xiii) are as above. In an embodiment, the symm. polyene is selected from structure vii) and structure ix) wherein $R_{13} = R_{14}$, and wherein the asymm. polyene is selected from structures viii) or ix) wherein $R_{13} \neq R_{14}$. In an embodiment, the polyene is selected from g) thru n):

g)

wherein t is from 2 to 20;

h)
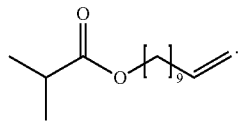

i)
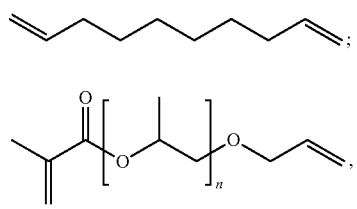

wherein n is from 1 to 50;

j)
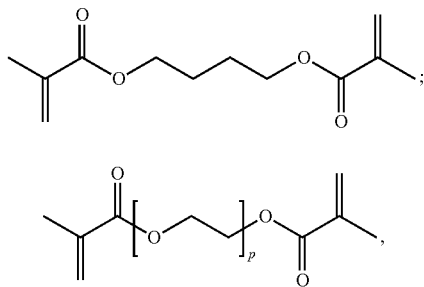

k)

wherein p is from 1 to 50;

l)
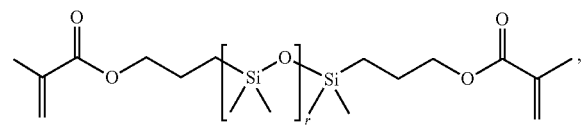

wherein r is from 1 to 1000;

m)
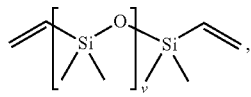

wherein v is from 1 to 1000;

n)
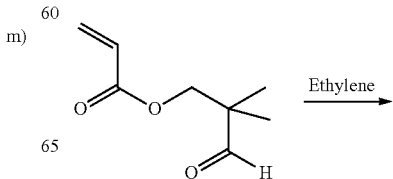

In an embodiment, the polyene is a symmetrical polyene selected from structures a), b), d), e), f), g), h) or combinations thereof. In an embodiment, the polyene is a symmetrical polyene selected from structures a), b), d), e), f), g), or h). In an embodiment, the symmetrical polyene is selected from structures a), d), f) or combinations thereof. In one embodiment, the symmetrical polyene is selected from a), d) or f). In an embodiment, the symmetrical polyene comprises a), or d), or f). In an embodiment, the mixture comprises a symmetrical polyene and an asymmetrical polyene; further the symmetrical polyene is selected from structures a), b), d), e), f), g), h) or combinations thereof, and the asymmetrical polyene is selected from c), i) or combinations thereof. In one embodiment, the reaction mixture further comprises at least one compound containing a carbon-carbon triple bond, as disclosed in WO2016/012534, incorporated herein by reference.

Desired Functionality and Reactivity of mCTAs

Typically a CTA is used in the high pressure polymerization to regulate the molecular weight. CTAs have the capability to donate a hydrogen radical by which an active radical at a growing polymer chain is terminated and a new active radical is formed at the remaining chain transfer agent molecule, which radical propagates the start of a new molecule by building in monomer units. For mCTAs, the desired functionality of the CT group is not starting a new polymer chain and affecting the average molecular weight, but initiating the formation of a T-branch or a LCB at an existing polymer molecule. For this desired functionality, it is important that the monomeric group has a high reactivity that ensures that preferably more than 90% of the mCTA is incorporated in the polymer structure. Once the mCTA is incorporated in the polymer structure, further reaction by the CTA functionality will lead to the formation of a T-branch. The free mCTA (not incorporated) can still act as a classical CTA to start a new molecule. It is therefore important that the reactivity parameters r1 and r2, describing the reactivity of the monomeric group, are respectively ≤0.25 and ≥4. The reactivity of chain transfer (CT) functionality, expressed as Cs value (see Cs values in Table 1, below), will determine the chance that a mCTA, incorporated by its monomeric functionality, will further react to form a T-branch. The probability that a mCTA will be incorporated, and further react to form a T-branch, will depend on the reactivity of the functional groups, and the feed location and the remaining conversion level in the reactor. Higher reactivities for the monomeric and CT functional group will respectively enhance the incorporation level and the T-branch level.

T-Branch Formation Through the Application of a Monomeric CTA:

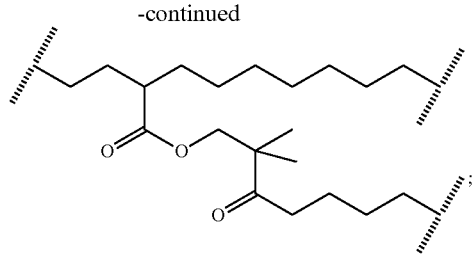

H-branch formation through the application of a polyene:

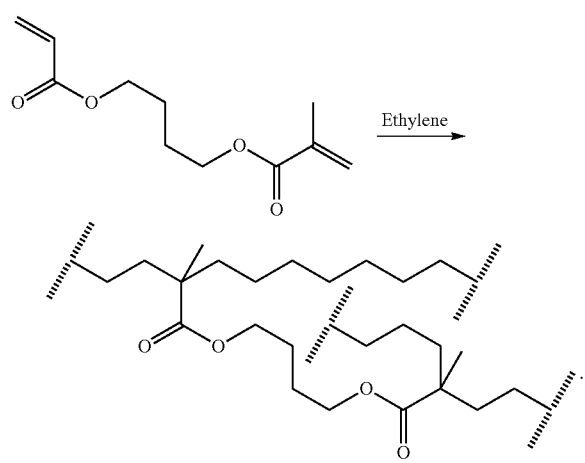

In these structures, the notation "//////" represents a break at the center of a covalent carbon-carbon bond in the hydrocarbon backbone of the ethylene-based polymer. In one embodiment, the ethylene-based polymer is a modified low density polyethylene, comprising, in polymerized form, ethylene, and bonded chemical groups derived from the symmetrical polyene. In a further embodiment, the modified LDPE comprises <2.0 wt %, further <1.0 wt %, of other comonomer(s), based on the weight of the modified LDPE. The invention also provides an ethylene-based polymer formed from an inventive process. In one embodiment, the ethylene-based polymer comprises at least one Structure II:

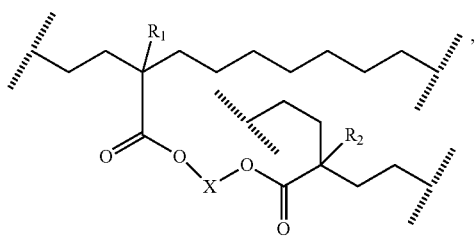

where $R_1$ and $R_2$ are the same, and are each independently selected from H or an alkyl, or from H and a $C_1$-$C_6$ group, and where and X is selected from —$(CR_2)_n$— where each R, independently, is H or alkyl group, and n is from 1 to 20, or —$(CR_2—CR_2—O)_n$— where each R, independently, is H or an alkyl group and n is from 1 to 20. In the above structure, the notation "//////" represents a break at the center of a covalent carbon-carbon bond in the hydrocarbon backbone of the ethylene-based polymer.

In one embodiment, the ethylene-based polymer comprises, in reacted form, ≥0.2, or ≥0.3, or ≥0.4 moles of "T-branches derived from the use of a mCTA" per 1000 moles of carbon atoms incorporated into the polymer, or per 500 moles of ethylene units incorporated into the polymer. In one embodiment, the ethylene-based polymer comprises, in reacted form, ≤3.0 moles, or ≤2.0 moles, or ≤1.5 moles, or ≤1.0 mole of "T-branches derived from the use or a mCTA" per 1000 moles of carbon atoms incorporated into the polymer, or per 500 moles of ethylene units incorporated into the polymer. In one embodiment, the ethylene-based polymer containing >0.3 moles of "T-branches derived from the use of a mCTA" comprises, in reacted form, ≤3.0, or ≤2.0, or ≤1.5, or ≤1.2 moles of "overall H-branches" per 1000 moles of carbon atoms incorporated into the polymer, or per 500 moles of ethylene units incorporated into the polymer. In one embodiment, the ethylene-based polymer comprises, in reacted form, ≥0.01, or ≥0.02, or ≥0.03 moles of "overall H-branches" polyene per 1000 moles of carbon atoms, and ≥0.1, or ≥0.2, or ≥0.3 moles of T-branches, derived from the use of a mCTA, per 500 moles of ethylene units incorporated into the polymer. In one embodiment, in which at least one polyene is included in the reaction mixture, the ethylene-based polymer comprises, in reacted form, ≥0.015 moles of the polyene per 1000 moles of carbon atoms incorporated, or per 500 moles of ethylene units incorporated into the polymer. In one embodiment, in which at least one polyene is included in the reaction mixture, the ethylene-based polymer comprises, in reacted form, ≤1.0 mole, or ≤0.6 moles, or ≤0.4 moles, or ≤0.2 moles of polyene per 1000 moles of carbon atoms, or per 500 moles of ethylene units incorporated into the polymer. In one embodiment, the ethylene-based polymer comprises, in reacted form, ≥0.03 wt % of the polyene, based on the weight of the polymer.

In one embodiment, the ethylene-based polymer has a melt index ($I_2$) from 0.1 to 100, or from 0.1 to 50, or from 0.1 to 30 g/10 min. In one embodiment, the ethylene-based polymer has an $I_2$ from 0.3 to 100, or from 0.3 to 50, or from 0.3 to 30, or from 0.5 to 30, or from 1.0 to 10 g/10 min. In one embodiment, the ethylene-based polymer has an $I_2$ from 0.3 to 100, or from 1 to 50, or from 2 to 20, or from 2 to 10 g/10 min. In one embodiment, the ethylene-based polymer has an $I_2$ from 1 to 20 g/10 min. In one embodiment the ethylene-based polymer has a density ≥0.916, or ≥0.917, or ≥0.918, or ≥0.919, or ≥0.920, or ≥0.921, or ≥0.922, or ≥0.923 g/cc. In one embodiment, the ethylene-based polymer has a density ≤0.940 g/cc, or ≤0.935 g/cc, or ≤0.932 g/cc. In one embodiment, the ethylene-based polymer has a density from 0.916 to 0.940 g/cc. In one embodiment, the ethylene-based polymer has a density from 0.916 to 0.940 g/cc, or from 0.916 to 0.935 g/cc, or from 0.918 to 0.932 g/cc. In one embodiment, the ethylene-based polymer has a density from 0.915 to 0.935, or from 0.920 to 0.930, or from 0.921 to 0.930, or from 0.918 to 0.926 g/cc. In one embodiment, the density is from 0.921 to 0.928, or from 0.921 to 0.932, or from 0.921 to 0.940 g/cc. In one embodiment, the density is from 0.916 to 0.940, or from 0.920 to 0.928, or from 0.922 to 0.940 g/cc. In one embodiment, the ethylene-based polymer has a G' value that meets the following: G' (at G'=500 Pa, 170° C.)≥C+Dlog ($I_2$), wherein C=170 Pa, D=−90.0 Pa/[log (dg/min)] and $I_2$ is the melt index. In one embodiment, the ethylene-based polymer has a G' value that meets the following relationship: G' (at G'=500 Pa, 170° C.)≥C+Dlog ($I_2$), wherein C=175 Pa, D=−90.0 Pa/[log (dg/min)] and I2 is the melt index. In one embodiment, the ethylene-based polymer has a G' value that meets the following: G' (at G'=500 Pa, 170° C.)≥C+Dlog ($I_2$), wherein C=175 Pa, D=−90.0 Pa/[log (dg/min)] and a melt index ($I_2$) from 1 to 20 g/10 min.

The invention also provides a composition comprising an inventive ethylene-based polymer. In one embodiment, the composition further comprises an ethylene/α-olefin interpolymer with a density ≤0.954 g/cc. In one embodiment, the composition further comprises another ethylene-based polymer that differs from the inventive ethylene-based polymer in one or more properties, for example, density, melt index ($I_2$), melt elasticity, melt strength, Mw(conv), Mn(conv), and/or Mw(conv)/Mn(conv). The invention also provides an article comprising at least one component formed from an inventive composition. In one embodiment, the article is a film or coating, for example, an extrusion coating. In one embodiment, the article is a film. In another embodiment, the article is a coating. In one embodiment, the article is a coating for a wire or cable, and further, the wire or cable is an electrical or telecommunications wire or cable. In one embodiment, the article is a coated sheet, and further, the sheet is selected from a metal, a paper, or another polymer substrate or combinations thereof. In a further embodiment, the coated sheet is used in a wire or cable design. In another embodiment, the coated sheet is used in a packaging application. An inventive ethylene-based polymer, composition or article may comprise ≥2 embodiments described herein.

For producing a highly branched ethylene-based polymer, a high pressure free-radical initiated polymerization process is typically used. Two different high pressure free-radical initiated polymerization reactor types are known: an agitated autoclave having one or more reaction zones and several injection points for initiator and/or monomer feeds, and a jacketed tube having one or more reaction zones. Suitable, but not limiting, reactor lengths may be from 100 to 3600 meters (m), or from 1000 to 2800 m. The beginning of a reaction zone, for either type of reactor, is typically defined by the side injection of initiator of the reaction, ethylene, CTA (or telomer), or comonomer(s), and any combination thereof. A high pressure process can be carried out in autoclave or tubular reactors having one or more reaction zones, or in a combination of autoclave and tubular reactors, each comprising one or more reaction zones. In one embodiment, the reactor configuration comprising a tubular reactor. Often a CTA (system) is used to control molecular weight. In one embodiment, one or more CTAs (CTA system) are added to an inventive polymerization. CTAs typically comprise at least one of the following groups: alkanes, alkenes, aldehydes, ketones, alcohols, acetates, ethers, esters, mercaptans, or phosphine. In a further embodiment, a CTA comprises at least group of an alkane, an unsaturated hydrocarbon, a ketone, an aldehyde, an alcohol or ether. In an embodiment, the CTA (system) comprises at least one of the following compounds: alkanes, alkenes, aldehydes, ketones, alcohols, acetates, ethers, esters, mercaptans or phosphines; or at least one of the following compounds: alkanes, alkenes, aldehydes, or ketones. CTAs include, but are not limited to, propylene; isobutane, n-butane, 1-butene, methyl ethyl ketone, acetone, ethyl acetate, propionaldehyde, ISOPAR-C, -E, and -H (ExxonMobil Chemical Co.), and isopropanol; and more preferably propylene, propionaldehyde, butane and isobutane. In one embodiment, from 0.01 to 10 wt %, based on the weight of the total reaction mixture of the CTA is used.

In one embodiment, CTA system(s) is/are added in at least zones 1 and zone i, wherein i ≥1, and wherein reaction zone i is downstream from reaction zone 1, and wherein the ratio of "the activity of the CTA system in the feed to reaction zone 1" to "the activity of the CTA system in the feed to reaction zone i" ($Z_1/Z_i$) is ≤1.00, preferably ≤0.90, or ≤0.82, or ≤0.74. In a further embodiment, ($Z_1/Z_i$) is ≥0.40, or ≥0.45, or ≥0.50. In one embodiment, CTA system(s) is/are added to at least zones 1 and zone i, wherein i≥1, and wherein reaction zone i is downstream from reaction zone 1, and wherein the ratio of "the activity of the CTA system in the feed to reaction zone 1" to "the activity of the CTA system in the feed to reaction zone i" ($Z_1/Z_i$) is ≥0.90, preferably ≥0.92, or ≥0.92, or ≥1.00. In one embodiment, CTA system(s) is/are added in at least zones 1 and zone i, wherein i≥1, and wherein reaction zone i is downstream from reaction zone 1, and wherein the ratio of "the activity of the CTA system in the feed to reaction zone 1" to "the activity of the CTA system in the feed to reaction zone i" ($Z_1/Z_i$) is from 0.90 to 1.40, or from 0.90 to 1.30, or from 0.90 to 1.20, or from 0.92 to 1.40, or from 0.92 to 1.30, or from 0.92 to 1.20, or from 0.92 to 1.10, or from 0.92 to 1.00, or from 0.92 to 0.98. In one embodiment, CTA system(s) is/are added in at least zones 1 and zone i, wherein i≥3, and wherein reaction zone i is the last reaction zone and is downstream from reaction zone 1, and wherein the ratio of "the activity of the CTA system in the feed to reaction zone 1" to "the activity of the CTA system in the feed to reaction zone i" ($Z_1/Z_i$) is ≤1.3, or ≤1.2, or ≤1.1. In one embodiment, CTA system(s) is/are added in at least zones 1 and zone i, wherein i≥3, and wherein reaction zone i is the last reaction zone and is downstream from reaction zone 1, and wherein the ratio of "the activity of the CTA system in the feed to reaction zone 1" to "the activity of the CTA system in the feed to reaction zone i" ($Z_1/Z_i$) is ≥0.1, or ≥0.2, or ≥0.3. In one embodiment, $Z_1/Z_i$ is ≤(0.8−0.2*log(Cs)), or <(0.75-0.2*log(Cs)), or <(0.7-0.2*log(Cs)), wherein Cs is from 0.0001 to 10 and, in embodiments in which the CTA system comprises two or more CTAs, the Cs is the average Cs (see Eqn. F, below). In one embodiment, $Z_1/Z_i$ is ≤(0.8−0.2*log(Cs)), or <(0.75−0.2*log(Cs)), or ≤(0.7−0.2*log(Cs)), wherein Cs is from 0.0001 to 10, wherein $Z_1/Z_i$≠1 and, in embodiments in which the CTA system comprises two or more CTAs, the Cs is the average Cs (see Eqn. F, below). In one embodiment, the overall Cs value (chain transfer activity coefficient) of the applied CTA system is ≤0.006, or ≤0.008, or ≤0.010, or ≤0.015, or ≤0.020, as measured by Mortimer et al., at 130° C. and 1360 atm.

In one embodiment, the weight ratio of the amount of mCTA added to the first reaction zone (zone 1) to the amount of mCTA added to the ith reaction zone is less than 1.00. In an embodiment comprising more than two reaction zones, no mCTA is fed to reaction zone 1 and reaction zone 2 receives a larger amount of mCTA than the sequential reaction zones. In one embodiment, the process includes a high pressure and low pressure recycle loop to improve ethylene efficiency, since ethylene is only partially converted or consumed per reactor pass. Typically, the conversion level per reactor pass is from 20% to 40%. In one embodiment, the polymerization may take place in a tubular reactor as described in WO2013/059042, which uses a multi-zone reactor and alternate locations of feeding fresh ethylene to control the ethylene to CTA ratio and therefore polymer properties. Fresh ethylene may be simultaneously added in multiple locations to achieve the desired ethylene to CTA ratio. In a similar way, addition of fresh CTA addition points may be carefully selected to control polymer properties as described WO2013/078018. Fresh CTA may be simultaneously added in multiple locations to achieve the desired CTA to ethylene ratio. Likewise, the addition points and the amount of mCTA, may be controlled to reduce consumption, while maximizing the G' and performance in targeted applications. In one embodiment, the mCTA is added to the first, second, or first and second reaction zones. Likewise, the addition points and the amount of the make-up polyene (branching agent) may be controlled to control gels formation while maximizing the desired property of increased G' and performance in targeted applications. In one embodiment, make-up polyene may be simultaneously added in multiple locations to achieve the desired polyene to ethylene ratio (for example, a molar ratio). The use of a polyene (or branching and/or coupling agent) to broaden MWD and to increase the G' will put further requirements on the selection and distribution of the CTA and the polyene along a reactor system, to achieve the desired change in product properties without or minimizing potential negative impacts like gel formation, reactor fouling, process instabilities, and low efficiency of polyene. The addition points and amounts of make-up ethylene, make-up CTA, and make-up polyene may be appropriately controlled to achieve the desired ratios of CTA to ethylene and polyene to ethylene in the feeds to and/or in the reaction zones. In one embodiment, the polyene (branching agent) is a symmetrical diene, and is added to the polymerization in an amount from 0.002 to 0.300 mole %, or from 0.005 to 0.300 mole %, based on the total moles of ethylene and symmetrical diene added to the polymerization. In one embodiment, the polyene is an asymmetrical diene, and is added to the polymerization in an amount from 0.0002 to 0.300 mole %, or from 0.005 to 0.300 mole %, based on the total moles of ethylene and asymmetrical diene added to the polymerization. In one embodiment, the polymerization takes place in at least one tubular reactor. In one embodiment, the polymerization takes place in two reactors. In one embodiment, the polymerization takes place in one reactor with ≥two reaction zones. In one embodiment, the polymerization takes place in a reactor configuration comprising at least two reaction zones, reaction zone 1 and reaction zone i (i≥2), and wherein reaction zone i is downstream from reaction zone 1. In an embodiment, i is from 2-5, or from 2-4. In an embodiment, i=2. In one embodiment, the total number of reaction zones=i, wherein i is ≥2. In an embodiment, i is from 2 to 20, or from 2 to 10, or from 2 to 6.

In one embodiment, less mCTA by mass is added to reaction zone i, where i is >2, as compared to the amount of mCTA by mass added to reaction zone 1. As stated, the amount of mCTA is determined based on the mCTA added to a reaction zone in a make-up feed (i.e., not carry-over mCTA (from previous reaction zone)). In one embodiment, a lower concentration of mCTA is added to reaction zone i, where i is >2, as compared to the concentration of mCTA added to reaction zone 1. For example, see wt % BA feed distribution of I.Exs. 1-3 in Table 6. In one embodiment, mCTA is added to both reaction zone 1 and reaction zone 2. In one embodiment, mCTA is added to reaction zone 1, reaction zone 2 and reaction zone 3. In one embodiment, no mCTA is added to reaction zone 1.

In one embodiment, by use of a polyene in combination with a mCTA, more polyene by mass is added to reaction zone i, as compared to the amount of polyene, by mass, added to reaction zone 1. As used above, the amount of polyene is determined based on the polyene added to a reaction zone in a make-up feed (i.e., not carry-over polyene (from previous reaction zone)). In one embodiment by use of a polyene in combination with a mCTA, more polyene, by mass, is added to reaction zone 1 as compared to the amount of polyene, by mass, added to reaction zone i. As used above, the amount of polyene is determined based on the polyene added to a reaction zone in a make-up feed (i.e., not carry-over polyene). In one embodiment by use of a polyene in combination with a mCTA, a greater concentration of polyene is added to reaction zone i, as compared to the concentration of polyene added to reaction zone 1. See wt % BA feed distribution of I.Ex. 4 in Table 6. In one embodiment by use of a polyene in combination with a mCTA, a greater concentration of polyene is added to reaction zone 1, as compared to the concentration of polyene added to reaction zone i. See wt % BA feed distribution of I.Ex. 4 in Table 6. In one embodiment by use of a polyene in combination with a mCTA, polyene is added to both reaction zone 1 and reaction zone 2. In one embodiment by use of a polyene in combination with a mCTA, polyene is added to reaction zone 1, reaction zone 2 and reaction zone 3. In one embodiment by use of a polyene in combination with a mCTA, polyene is added to reaction zone 2 and reaction zone 3. In one embodiment by use of a polyene in combination with a mCTA, no polyene is added to reaction zone 1.

In one embodiment, prior to being fed into a reaction zone, the branching agent(s) are fed through a compression stage of a secondary compressor. In an embodiment, the branching agent(s) are fed through a compression stage of a secondary compressor prior to being fed into each reaction zone which receives branching agent(s). In another embodiment, the branching agent(s) are fed through a compression stage directly into a reaction zone or directly into the feed for a reaction zone. The choice of feed point into the reaction and/or a reaction zone depends on several factors, including, but not limited to, the solubility of the branching agents in pressurized ethylene and/or solvent, the condensation of the branching agent(s) in pressurized ethylene, and/or the preheater fouling by premature polymerization of the branching(s). In an embodiment, the concentration of mCTA in the total ethylene feed to the reactor is <2.0, or <1.0, or <0.5, or <0.3 mole percent, based on the total moles of ethylene fed to the re-actor. In an embodiment, the concentration of polyene in the total ethylene feed to the reactor is <0.20, or <0.10, or <0.05, or <0.03 mole percent, based on the total moles of ethylene fed to the reactor. In an embodiment, the molar ratio of mCTA versus polyene in the total ethylene feed to the reactor is ≥1, or ≥2, or ≥3, or ≥4, or ≥6. In one embodiment, the ethylene fed to the first reaction zone is at least 10 wt % of the total ethylene fed to the polymerization. In one embodiment, the ethylene fed to the first reaction zone is from 10 to 100 wt %, or from 20 to 80 wt %, or from 25 to 75 wt %, or from 30 to 70 wt %, or from 40 to 60 wt % of the total ethylene fed to the polymerization. In one embodiment, the ethylene-based polymer further comprises one or more comonomers, and preferably one comonomer. Comonomers include α-olefins, vinylacetates, acrylates, methacrylates, anhydrides, vinylsilanes, or combinations thereof, each typically having no more than 20 carbon atoms. In one embodiment, the ethylene-based polymer comprises one or more comonomers selected from -olefins, vinylacetates, acrylates, methacrylates, anhydrides, vinylsilanes, or combinations thereof. In one embodiment, the ethylene-based polymer comprises one comonomer. In one embodiment, the ethylene-based polymer comprises >90 wt %, further >92 wt %, and further >93 wt % of polymerized ethylene, based on the weight of the polymer. In one embodiment, the ethylene-based polymer comprises >95 wt %, further >98 wt %, and further >99 wt % of polymerized ethylene, based on the weight of the polymer. In an embodiment, the ethylene-based polymer is an ethylene homopolymer. In one embodiment, branching agent(s)

are added prior to, or simultaneously with, the addition of free-radical initiator at the inlet of the reaction zone. Preferably, the BA(s) are added prior to the initiator to allow for a good dispersion of the BA(s).

A free radical initiator, as used here, refers to a free radical generated by chemical and/or radiation means. Free radical initiators include organic peroxides including cyclic peroxides, diacyl peroxides, dialkyl peroxides, hydroperoxides, peroxycarbonates, peroxydicarbonates, peroxyesters, and peroxyketals. Preferred initiators are t butyl peroxy pivalate, di-t-butyl peroxide, t-butyl peroxy acetate and t-butyl peroxy-2-hexanoate, or mixtures thereof. In one embodiment, these organic peroxide initiators are used in an amount from 0.001 to 0.2 wt %, based upon the weight of polymerizable monomers. In one embodiment, an initiator is added to at least one reaction zone, and has a half-life temperature, at one second, >255° C. or >260° C. In a further embodiment, initiators are used at a peak polymerization temp. from 320° C. to 350° C. In a one embodiment, the initiator comprises at least one peroxide group incorporated in a ring structure. Examples include TRIGONOX 301 (3,6,9-triethyl-3,6,9-trimethyl-1,4,7-triperoxonaan) and TRIGONOX 311 (3,3,5,7,7-pentamethyl-1,2,4-trioxepane), both from Akzo Nobel, and HMCH-4-AL (3,3,6,6,9,9-hexamethyl-1,2,4,5-tetroxonane) from United Initiators. See WO 02/14379 and WO 01/68723.

In one embodiment, for the polymerization process described herein, the max. (or peak) temp. for each reaction zone is from 150° C. to 360° C., or from 170° C. to 350° C., or from 200° C. to 340° C. In a further embodiment, the max. temp. for each reaction zone which receives make-up polyene (i.e., new and/or recycled polyene, not including carry-over polyene (from previous reaction zone)) is from 260° C. to 330° C., or from 270° C. to 320° C., or from 280° C. to 310° C. In one embodiment, the max. temp. in the first reaction zone is greater than the max. temp. in each subsequent or consecutive reaction zone. In one embodiment, the max. temp. in the first reaction zone is ≥300° C., or ≥310° C., or ≥320° C. In one embodiment, the max. temperature in the first reaction zone is ≥10° C., or ≥20° C., or ≥30° C. high than the max. temp. of each consecutive reaction zone. In one embodiment, the max. temp. of the last reaction zone is< the max. temp. of each prior reaction zone. In one embodiment, the polymerization pressure, as measured at the first inlet of the reactor, is from 1000 bar to 3600 bar, or from 1200 bar to 3500 bar, or from 1500 to 3400 bar, or from 2000 to 3200 bar. In one embodiment, the polyene is subject to an "oxygen removal step" prior to being fed to a reaction zone. In one embodiment, the polyene is stored in a feed vessel, and wherein the feed vessel has a "head-space gas" comprising less than 5.0 volume percent oxygen. In one embodiment the total ethylene-based feed flow to the reactor from 30 to 400 tons/hr, or from 50 to 400 tons/hr, or from 75 to 400 tons/hr, or from 100 to 400 tons/hr. An inventive process may comprise a combination of two or more embodiments as described herein. An inventive composition may comprise one or more additives. Additives include stabilizers (e.g., antioxidants), plasticizers, antistatic agents, pigments, dyes, nucleating agents, fillers, slip agents, fire retardants, processing aids, smoke inhibitors, viscosity control agents and anti-blocking agents. The composition may, for example, comprise less than 10% of the combined weight of one or more additives, based on the weight of the inventive polymer. An inventive composition may further comprise at least one other polymer in addition to an inventive ethylene-based polymer.

Definitions

Unless stated to the contrary, implicit from the context, or customary in the art, all parts and percents are based on weight, and all test methods are current as of the filing date of this application. The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not listed. The term "composition," as used herein, includes a mixture of materials, which comprise the composition, as well as reaction products and decomposition products formed from the materials of the composition. The terms "blend" or "polymer blend," as used, refers to a mixture of two or more polymers. A blend may or may not be miscible (not phase separated at molecular level).

The term "polymer" refers to a compound prepared by polymerizing monomers, whether of the same or a different type. The generic term polymer thus embraces the term homopolymer and the term "interpolymer" as defined below. Trace amounts of impurities may be incorporated into and/or within the polymer. The term "interpolymer" refers to polymers prepared by the polymerization of at least two different types of monomers. The generic term interpolymer includes copolymers (which refers to polymers prepared from two different monomers), and polymers prepared from more than two different types of monomers. The term "ethylene-based polymer" refers to a polymer that comprises a majority amount of polymerized ethylene, based on the weight of the polymer, and, optionally, at least one comonomer. The term "ethylene-based interpolymer" refers to an interpolymer that comprises a majority amount of polymerized ethylene, based on the weight of the interpolymer, and at least one comonomer. The term "ethylene-based copolymer" refers to a copolymer that comprises a majority amount of polymerized ethylene, based on the weight of the interpolymer, and a comonomer as the only monomer types. The term "propylene-based polymer" refers to a polymer that comprises a majority amount of polymerized propylene, based on the weight of the polymer, and, optionally, at least one comonomer.

The term "polyene," as used herein, refers to a poly-unsaturated compound having two or more carbon-carbon double bonds. Examples of polyenes are provided above. The term "CTA system," as used herein, refers the type and amount of CTA used in a reactor system having two or more reactors or reaction zones, excluding mCTAs. The term "monomeric CTA (mCTA)," as used herein, refers to a poly-functional compound having one or more carbon-carbon double bonds and having one or more functional groups with a chain transfer activity (Cs) value measured by Mortimer at 130° C. and 1360 atm of equal to or greater than 0.10. Examples of mCTAs are listed herein. mCTAs exclude hydrocarbon olefins, such as 1-butene and propylene. For example, mCTAs exclude $C_3$-$C_{20}$ unsaturated hydrocarbons. The terms "rheology modifier" or "rheology modifying agent," as used herein, refer to a polyene, as described herein, which are able to change the rheology of the polymer, for example, increase G' and/or melt strength, when incorporated into the polymer. Typical rheology modifiers include symmetrical and asymmetrical polyenes and mCTAs. The term "branching agent," abbreviated as "BA," as used herein, refers to components able to form H- or T-branches in a polymer by which the rheology of the polymer is modified, for example, increase of G' and melt strength. Typical BAs include asymmetrical/symmetrical polyenes and mCTAs. The term "coupling agent," as used herein, refers to components able to form H-branches between two polymer molecules by which the rheology of the polymer is modified, for example, by increase of G' and melt strength.

The term "alkyl," as used herein, refers to a saturated linear, cyclic, or branched hydrocarbon group. Examples of suitable alkyl groups include methyl, ethyl, n-propyl, i-propyl, n-butyl, t-butyl, i-butyl (or 2-methylpropyl), etc. In one embodiment, the alkyl has 1 to 20 carbon atoms.

The term "high pressure polymerization process," as used herein, refers to a free radical polym. process carried out at an elevated pressure of at least 1000 bar (100 MPa). The terms "feed" or "feed stream," as used herein, refer to make-up and/or recycled component added to a reaction zone at an inlet. A feed may consist of mCTA, polyene or ethylene, comprise mCTA, polyene or ethylene, or comprise mCTA, polyene and ethylene. The term "feed component(s)" refers to the component(s) added to a reaction zone at the inlet to the reaction zone. The terms "ethylene feed" or "ethylene feed stream," or "ethylene based feed," or similar terms, as used herein, refer to the make-up ethylene and/or recycled ethylene and other reactant(s) added to a reaction zone at the inlet to the reaction zone. Typically the feed contains a majority molar amount of ethylene, based on the total moles of all the components in the feed stream.

The terms "side stream" or "side feed stream," as used herein, refer to the ethylene-rich feed stream (typically majority wt % ethylene based on the total weight of components in the stream) to sequential reaction zones. The term "make-up," when used herein, in reference to a reactant (i.e., "make-up ethylene," "make-up CTA," "make-up mCTA," etc.), refers to the feed stream of the reactant needed to compensate for the converted and/or lost reactant in the high polymerization process. The term "recycle stream," as used herein, refers to recycled ethylene, and, optionally, other reactants and/or other components that are separated from the polymer after exiting a reactor and are fed to one or more reaction zones at the inlet to each reaction zone. The term "reactor configuration" or "reactor system," as used herein, refers to the components (devices) used to polymerize and isolate a polymer. Such components/devices include, but are not limited to, one or more reactors, a Secondary compressor, a Primary compressor, and a Booster compressor.

The term "reaction zone," as used herein, refers to a reactor zone where polymerization reaction is initiated or reinitiated by the addition of free radicals and/or components which dissociate into and/or generate free radicals. Typically, the reaction medium is heated and/or cooled by a heat transfer medium flowing through the jacket around the reactor. A reaction zone may also start with the addition of make-up ethylene and/or free radicals or components which dissociate into and/or generate free radicals. The term "first reaction zone," as used herein, refers to the first reactor zone where the polymerization is initiated by the addition of radicals or components which dissociate into and/or generate radicals. The first reaction zone ends at the point where there is a new feed of make-up and/or recycled ethylene, radicals, and/or components which dissociate into and/or generate radicals. The terms "subsequent reaction zone," or "sequential reaction zone," as used herein, refer to a reactor zone which receives ethylene and polymer from a previous reactor zone, and where radicals and/or components which dissociate into and/or generate radicals are added at the inlet of the subsequent (or sequential) reactor zone. The subsequent (or sequential) reaction zone ends at the point where there is a new feed of make-up and/or recycled ethylene, radicals, and/or components which dissociate into and/or generate, radicals; however, the nth reaction zone ends at the position of a pressure control device of the reactor system. The number of subsequent (or sequential) reaction zones is (i−1), where i is the total number of reaction zones. The term "injection point," as used herein, refers to the inlet location of a device (used in a polymerization process) where a feed stream is added to the device.

The terms "chain transfer constant" and "chain transfer coefficient," Cs value, as used herein, refer to the ratio between the "rate of chain transfer" to the "rate of ethylene propagation." See Mortimer references above. The term "chain transfer activity," as used herein, refers to the sum of molar conc. of each applied CTA component multiplied with its chain transfer constant (Cs). The chain transfer constant (Cs) is the ratio of reaction rates $k_s/k_p$, determined at a reference pressure of 1360 atm and a reference temperature of 130° C. See Mortimer references above. The term "activity of a CTA system," as used herein, refers to the sum of the products of a CTA's conc. and its Cs value for each CTA in the CTA system (See Eqn. B).

The Booster compressor (Booster) is a device that compresses the following: a) the low pressure recycle coming from the LPS (Low Pressure Separator), and b) optionally, the recycled compressor packing leaks, each to the pressure level required at the inlet side of the Primary compressor. A Booster can consist of single or multiple compressor frames, and can be potentially combined with Primary compressor frame(s). The Primary compressor (Primary) is a device that compresses the following: a) the make-up incoming ethylene, and/or b) the low pressure recycle coming from the Booster, and/or c) the recycled compressor packing leaks, each to the pressure level required to feed the inlet side of the Hyper compressor. The Primary can consist of single or multiple compressor frames, and can be potentially combined with Booster compressor frame(s). Hyper compressor (Hyper), or Secondary compressor, is a device that compresses the following: a) the ethylene coming from the HPR (High Pressure Recycle), and/or b) the Primary, each to a pressure level required to feed the reactor at its inlet pressure set point. The Hyper comprises a plunger reciprocating compressor, and can consist of single or multiple compressor frame(s). For each device, a compression can be combined with intermediate cooling.

Test Methods

Density—

Samples that were measured for density were prepared according to ASTM D4703: Annex A: Method C. Samples were pressed at 190° C. and 3,000 psi for five mins., 15 tons for two mins., and then cooled, under pressure, at 15° C./min. Density measurements were made after conditioning at 23° C. and 50% R.H. for 40 hrs, using ASTM D792 Method B. Melt Index—Melt index, or 12, was measured in accordance by ASTM D 1238, Condition 190° C./2.16 kg, and was reported in g/10 minutes. The 110 was measured in accordance with ASTM D) 1238, Condition 190° C./10 kg, and was reported in g/10 min.

Rheological G'—

The sample used in the G' measurement is prepared from a compression molding plaque. A piece of aluminum foil is placed on a back plate, and a template or mold is placed on top of the back plate. Approx. 12 g of resin is placed in the mold, and a second piece of aluminum foil is placed over the resin and mold. A second back plate is then placed on top of the aluminum foil. The total ensemble is put into a compression molding press run at the following conditions: 3 min at 150° C. and 10 bar, followed by 1 min at 150° C. and 150 bar, followed by a "1.5 min" quench cooling to room temperature at 150 bar. A 25 mm disk is stamped out of the compression-molded plaque. The thickness of the disk is approx. 2.0 mm. The rheology measurement to determine G' is done in a nitrogen environment at 170° C. and a strain of 10%. The stamped-out disk is placed between the two "25 mm" parallel plates located in an ARES-1 (Rheometrics SC) rheometer oven, which is preheated for at least 30 min. at 170° C., and the gap of the "25 mm" parallel plates is slowly reduced to 1.65 mm. The sample is then allowed to remain for exactly 5 min. at these conditions. The oven is then opened, the excess sample is carefully trimmed around the edge of the plates, and the oven is closed. The storage modulus (G') and loss modulus (G") are measured via a small amplitude, oscillatory shear according to a decreasing frequency sweep form 100 to 0.1 rad/s (when able to obtain a G" value lower than 500 Pa at 0.1 rad/s), or from 100 to 0.01 rad/s. For each frequency sweep, 1-points (logarithmically spaced) per frequency decade are used. The data are plotted (G' (Y-axis) versus G" (X-axis)) on a log-log scale. The Y-axis scale covers the range from 10 to 1000 Pa, while the X-axis scale covers the range from 100 to 1000 Pa. The Orchestrator software is used to select the data in the region where G" is between 200 and 800 Pa (or using at least 4 data points). The data are fit to a log polynomial model using the fit equation Y=C1+C2 ln(x). Using Orchestrator software, G' at G" equal to 500 Pa is determined by interpolation. G' at G"=500 Pa.

Gel Content Measurement—

The apparatus consists of a 4-zone laboratory extruder, Model OCS ME 20, with a "150 mm ribbon die (cast film die)," a CR-8 winding unit, an air knife, and an FS-3 line scan camera (50 micron resolution; available from OCS Optical Control Systems GmbH Hullener Feld 36, 58454 Witten, Germany, or an equivalent). Material-specific settings for film-manufacturing: the temp. setting for the heating zones at cylinder and die is determined for an ethylene-based polymer according to MFR-ranges in two groups, as follows: Group 1: MFR-range 1.5-3 g/10 min (190° C./2.16 kg), temps: 160 (first zone)/180/180/180/180° C. (die). Group 2: MFR-range 3-6 g/10 min (190° C./2.16 kg), temps: 150/150/150/150/150° C. Preset Parameters: Rotational speed (screw): 70 rpm; Haul-off speed: 4 m/min; the cast film thickness is 76 µm±5 µm. One analysis inspects 50 parcels, where a parcel is defined as "24.6 cm$^3$" volume of film which corresponds to a "0.324 m$^2$" surface area for a film thickness of 76 µm. Analysis: G1200=the average sum of 50 parcels of "the areas of all gels greater than 200 µm in diameter in each parcel." Diameter of gel is determined as the diameter of a circle having equivalent area.

EXPERIMENTAL

Calculations for Z1 and Zi:

The "reactor zone molar concentration of a CTA j in a reactor zone i ([CTA]ji)" is defined as the "total molar amount of that CTA injected to reactor zones 1 to i" divided by the "total molar amount of ethylene injected to reactor zones 1 to i." This relationship is shown below in Eqn. A, wherein j=1 to $n_{comp}$, wherein $n_{comp}$ is the total number of CTA components in the CTA system $$[CTA]_{j_i} = \frac{\sum_{k=1}^{i} n_{CTA,j_k}}{\sum_{k=1}^{i} n_{eth_k}}. \quad \text{(Eqn. A)}$$

In Eqn. A, $j \geq 1$, $n_{CTA,j}$, is the "amount of moles of the jth CTA injected to the ith reactor zone," and $n_{eth_1}$ is the "amount of moles of ethylene injected to the ith reactor zone." The "transfer activity of a CTA (system) in a reactor zone i" ($Z_i$), where I is from 1 to n, and n is the total number of reaction zones, is defined as the "sum of the reactor zone molar concentration of each CTA in the reactor zone" multiplied with its chain transfer activity constant (Cs). The Cs is the ratio of reaction rates $k_s/k_p$, at a reference pressure (1360 atm) and a reference temperature (130° C.). This relationship is shown in Eqn B:

$$Z_i = \sum_{j=1}^{n_{comp,i}} [CTA]_{j_i} \cdot C_{s,j}. \quad \text{(Eqn. B)}$$

In Eqn. B, $[CTA]_{j_i}$ is the concentration of the CIA component j in the cumulative feed to reaction zone i (as defined in Eqn. A); $C_{s,j}$ is the Cs values of the CTA component $n_{comp}$, wherein $n_{comp}$ is the total number of CTA components in the ratio of the transfer activity or a CTA (system) in a reactor zone 1 ($Z_1$) to the transfer activity of a CTS (system) in a reactor zone i ($Z_i$) ($Z_1/Z_i$) is shown in $$\frac{Z_1}{Z_i} = \frac{\sum_{j_1=1}^{n_{comp,i}} [CTA]_{j_i} \cdot C_{s,j}}{\sum_{j_1=1}^{n_{comp,i}} [CTA]_{j_i} \cdot C_{s,j}}. \quad \text{(Eqn. C)}$$

(Eqn. C). The chain transfer constant (Cs) values for some chain transfer agents 1, derived by Mortimer at 130° C. and 1360 atm, are shown below in Table 1 below.

TABLE 1

|  | Cs (130° C., 1360 atm) | (0.8 − 0.2 * log(Cs)) | (0.75 − 0.2 * log(Cs)) |
|---|---|---|---|
| Methanol | 0.0021 | 1.34 | 1.29 |
| Propane | 0.00302 | 1.30 | 1.25 |
| n-butane | 0.005 | 1.26 | 1.21 |
| Isobutane | 0.0072 | 1.23 | 1.18 |
| Ethanol | 0.0075 | 1.22 | 1.17 |
| Propylene | 0.0122 | 1.18 | 1.13 |
| Acetone | 0.0168 | 1.15 | 1.10 |
| Butene-1 | 0.047 | 1.07 | 1.02 |
| MEK | 0.06 | 1.04 | 0.99 |
| PA | 0.33 | 0.90 | 0.85 |

In the above table, the Cs value is for a CTA system containing only the noted CTA. In Table 1, the Cs-Values as Measured by Mortimer at 130° C. and 1360 atm in References 2, 3 and 4 and calculated boundary values for Z1/Zi ratio. The Cs value is for a CTA system containing only the noted CTA. Ref. No. 2. G. Mortimer; Journal of Polymer Science: Part A-1; Chain transfer in ethylene polymerization; Vol 4, p 881-900 (1966). Ref. No. 3. G. Mortimer; Journal of Polymer Science: Part A-1; Chain transfer in ethylene polymerization. Part IV. Additional study at 1360 atm and 130° C.; Vol 8, p 1513-1523 (1970). Ref. No. 4. G. Mortimer; Journal of Polymer Science: Part A-1; Chain transfer in ethylene polymerization. Part VII. Very reactive and depletable transfer agents; Vol 10, p 163-168 (1972). See also P. Ehrlich, G. A. Mortimer, Fundamentals of the free radical polymerization of ethylene, Adv. Polymer Sci., Vol 7, 386-448 (1970); G. Mortimer, Journal of Polymer Science: Part A-1, Chain transfer in ethylene polymerization. Part V. The effect of temperature; Vol 8, p 1535-1542 (1970); G. Mortimer, Journal of Polymer Science: Part A-1, Chain transfer in ethylene polymerization Part V. The effect of pressure, Vol 8, p 1543-1548 (1970).

When only one CTA is used in the total reactor system, Eqns. B and C simplify to Eqns. D and E, respectively:

$$Z_i = [CTA]_i \cdot C_s, \quad \text{(Eqn. D)}$$

$$\frac{Z_1}{Z_i} = \frac{[CTA]_1 \cdot C_s}{[CTA]_i \cdot C_s} = \frac{[CTA]_1}{[CTA]_i}. \quad \text{(Eqn. E)}$$

For a multiple CTA-system an averaged Cs-value can be calculated with the following equation:

$$Cs(\text{averaged}) = \sum_1^n \frac{[CTA]_n * Cs_n}{\sum_1^n ([CTA]_n * Cs_n)} * Cs_n. \quad \text{(Eqn. F)}$$

An example calculation (propylene concentration=3400 mol-ppm; Cs value of propylene=0.0122; PA concentration=1650 mol-ppm; Cs value of PA=0.33):

$$Cs(\text{averaged}) = \frac{\begin{bmatrix} (3400 \text{ mol-ppm} * 0.0122 * 0.0122) + \\ (1650 \text{ mol-ppm} * 0.33 * 0.33) \end{bmatrix}}{(3400 \text{ mol-ppm} * 0.0122 * 0.0122 + 1650 \text{ mol-ppm} * 0.33)} = 0.31.$$

Polymerization Simulation Models

A polymerization simulation model with applied reaction scheme and kinetics is described by Goto et al, see reference below. Other reactor and product modeling frameworks are available through Aspen Plus of Aspen Technology, Inc., Burlington, Mass., USA; and PREDICI of Dr. Wulkow Computing in Technology GmbH (CiT), Rastede, Germany. Process and product responses predicted by these model frameworks are determined by the reactor parameters and the applied reaction scheme and kinetic parameters. The applied reaction scheme and kinetic parameters are described below. For each well-stirred autoclave reaction zone one calculation cell can be used. For each tubular reaction zone enough calculation cells are used to accurately represent the pressure, temperature and concentration profiles along the tubular reaction zone, such that the simulated product and process results, as reported in the simulated results, do not change with the addition of more cells. The polymerization simulations were achieved with Goto LDPE simulation model as described in the following: S. Goto et al; *Journal of Applied Polymer Science: Applied Polymer Symposium*, 36, 21-40, 1981 (*Title: Computer model for commercial high pressure polyethylene reactor based on elementary reaction rates obtained experimentally*). The kinetic data used by Goto et al. was derived from high pressure free radical polyethylene polymerization experiments performed at varying temperature, pressure and polymer concentrations as described in the following: K. Yamamoto, M. Sugimoto; *Rate constant for long chain-chain branch formation in free-radical polymerization of ethylene; J. Macromol. Science-Chem., A*13 (8), pp. 1067-1080 (1979). The following elementary reaction steps are described by Goto et al.: i) propagation of ethylene, ii) termination of radicals, iii) backbiting or SCB formation, iv) transfer to polymer or LCB formation, v) beta elimination of secondary radicals leading to vinyl formation, and vi) beta elimination of tertiary radicals leading to vinylidene formation. See Table 2 for kinetic data for main reactions, where ko is the pre-exponential or frequency factor; Ea is the activation energy, reflecting the temperature dependence; and $\Delta V$ is the activation volume, reflecting the pressure dependence. All kinetic constants are from Goto et al., except the ko, Ea and $\Delta V$ values for backbiting, which have been optimized to better reflect the level of methyl branches (as may be analyzed by C13 NMR technique) in high pressure polyethylene, as a function of pressure and temperature conditions.

TABLE 2

Kinetic Constants for Main Reactions

| Reaction | ko | Ea | $\Delta V$ |
|---|---|---|---|
| Units | m3/hr/kmol | cal/mol | cc/mol |
| Propagation | 5.63E+11 | 10520 | −19.7 |
| Termination | 3E+11 | 3000 | 13 |
| Backbiting | 2.6E+12 | 12130 | −14 |
| Transfer to Polymer | 1.75E+12 | 14080 | 4.4 |
| Beta Elimination of sec rad | 5.82E+11 | 15760 | −22.6 |
| Beta Elimination of tert rad | 8.51E+10 | 14530 | −19.7 |

The kinetic data for selected CTAs are given in Table 3. The kinetic constants haven been calculated with the help of the kinetic constants on the Cs-value (ks/kp), as determined by Mortimer (see references above), and the ethylene propagation kinetics as given by Goto et al. (see Table 2). The kinetic data for the selected mCTAs is given in Table 3. The kinetics on "chain transfer to modifier" describes the CTA functionality, while the monomeric functionality is described by the "reactivity ratios." The monomeric groups in the mCTAs and the polyenes have been described, and modeled, through assigning kinetic $r_1$ and $r_2$ reactivity ratios (see Tables 3 and 4). The kinetic $r_1$ and $r_2$ reactivity ratios are, by definition, linked to the ethylene propagation kinetics for their temperature (Ea) and pressure ($\Delta V$) dependencies. In the simulations, it was assumed that the polyenes do not exhibit additional chain transfer activity. Furthermore, for the total consumption, incorporation and H-branch (inter- and intra-molecular) formation, it has been assumed that, after incorporation of one functional group, the reactivity of the other functional group is not affected. In reality, the reactivity of second functional group will be decreased after incorporation of the polyene through its primary functional group in a polymer molecule. However, this assumption will not affect the first part of this study, as described in Tables 5 and 6. The second part of the study, comprising actual polymerization results and simulations of these, focuses on the incorporation of the rheology modifier in the polymer, and the conversion to H-branches, in order to increase melt strength and G' values of the polymer.

TABLE 3

Kinetic Constants for Selected CTA's and Polyenes (Bifunctional Components)

|  | Chain Transfer to Modifier | | | Reactivity Ratios | |
| --- | --- | --- | --- | --- | --- |
| Component | kao m³/hr/kgmol | Ea cal/mol | ΔV cc/mol | $r_1$ ($k_{11}/k_{12}$) | $r_2$ ($k_{22}/k_{21}$) |
| Propylene (CTA) | 2.20E+11 | 13220 | −16.7 | 3.10 | 0.77 |
| Propionaldehyde (CTA) | 1.07E+11 | 9720 | −8.4 | 0.00 | 0.00 |
| Isobutane (CTA) | 3.51E+11 | 14020 | −16.7 | 0.00 | 0.00 |
| mCTA | 1.88$^E$+11* | 10520* | −19.7* | 0.08** | 12.5** |

Note
*Kinetic parameters to describe reactivity of the CTA group of the mCTA.
Note
**Kinetic parameters to describe the reactivity of the monomeric group of the mCTA.

TABLE 4

Reactivity Ratios for Polyenes (Bifunctional Model Components)

|  |  | $r_{1B}/r_{1A}$ | $r_1$ ($k_{11}/k_{12}$) | $r_2$ ($k_{22}/k_{21}$) |
| --- | --- | --- | --- | --- |
| Sym bi-acrylate | Bond A | 1 | 0.08 | 12.50 |
|  | Bond B |  | 0.08 | 12.50 |
| Sym HC diene | Bond A | 1 | 1 | 1 |
|  | Bond B |  | 1 | 1 |
| BDMA | Bond A | 1 | 0.08 | 12.50 |
|  | Bond B |  | 0.08 | 12.50 |
| PPG-AEMA | Bond A | 1 | 0.08 | 12.50 |
|  | Bond B |  | 0.4 | 2.5 |

Sym bi-acrylate = symmetrical bi-acrylate.
Sym HC diene = symmetrical hydrocarbon diene.
BDMA = 1,4-butanediol dimethacrylate.
PPG-AEMA = poly(propylene glycol) allyl ether methacrylate.

Study 1—Simulated Polymerizations (Comparative and Inventive)
Description of Flow Diagrams and CTA and/or Polyene Peed Distributions—Overview Other than mentioned in the flow diagrams in FIGS. 2-4, described below, the polyene feed can optionally be freely distributed over the main compression streams fed to and/or distributed over the side streams (20) and/or (21) and/or front stream (9). Polyene streams (6) can be fed in the inlet(s), interstage(s), outlet(s) of the Hyper and/or directly into the reaction zones. Furthermore the polyene can be optionally dosed at the inlet, outlet or interstages of the Primary and/or Booster compressors. For each polymerization, in the Reactor, the polymerization is initiated with the help of free radical initiation systems, injected and/or activated at the inlet of each reaction zone. The max. temp. in each reaction zone is controlled at a set point by regulating the concentration and/or feed amount of initiation system at the start of each reaction zone. After finishing the reaction, and having applied multiple cooling steps, the reaction mixture is depressurized and/or cooled in (10), and separated in the high pressure separator (HPS). The HPS separates the reaction mixture into an ethylene rich stream (15), containing minor amounts of waxes and/or entrained polymer, and a polymer rich stream (11), which is sent for further separation to the LPS. Ethylene stream (15) is cooled and cleaned in stream (17). Stream (16) is a purge stream to remove impurities and/or inerts. The polymer separated in LPS is further processed in (12). The ethylene removed (13) in the LPS is fed to the Booster, where, during the compression, condensables such as solvent, lubrication oil and others are collected and removed through stream (14). The outlet of the Booster is combined with make-up ethylene stream (1), and further compressed by the Primary.

Description of Flow Diagram Used for C.Exs. 11-14 and I.Ex. 1—

FIG. 1 shows flow scheme of a simulated high pressure polymerization plant configuration containing a tubular reactor with an ethylene feed distribution of 100/0/0/0. Stream (1) is the make-up ethylene make-up, which is compressed together with the outlet of the Booster by the Primary to stream (2). Stream (2) is combined with high pressure recycle stream (18) and fed to the inlet of the "Hyper". The Hyper pressurizes the ethylene feed stream to a level sufficient to feed the high pressure tubular reactor (Reactor). Stream (4) depicts the CTA system make-up feed. CTA make-up streams (4) can be fed in the inlet(s), interstage(s), outlet(s) of the Hyper and/or inlet(s) of the reaction zones. Furthermore the CTA can be optionally dosed at the inlet, outlet or interstages of the Primary and/or Booster compressors systems. The CTA system can consist of single and/or multiple components and includes varying compositions. Stream (6) depicts the polyene feed. The discharge temperature of the Hyper is typically in the range of 60 to 100° C. The ethylene feed to the first reaction zone is typically preheated to a temp. in the range of 130 to 180° C., while the ethylene of the side feed is fed to the reactor at the Hyper discharge temperature or cooled prior to feeding to the reactor. For dimensions and configuration of the Reactor, see Table 5.

Description of Flow Diagram Used for C.Ex. 15—

Figure 2:
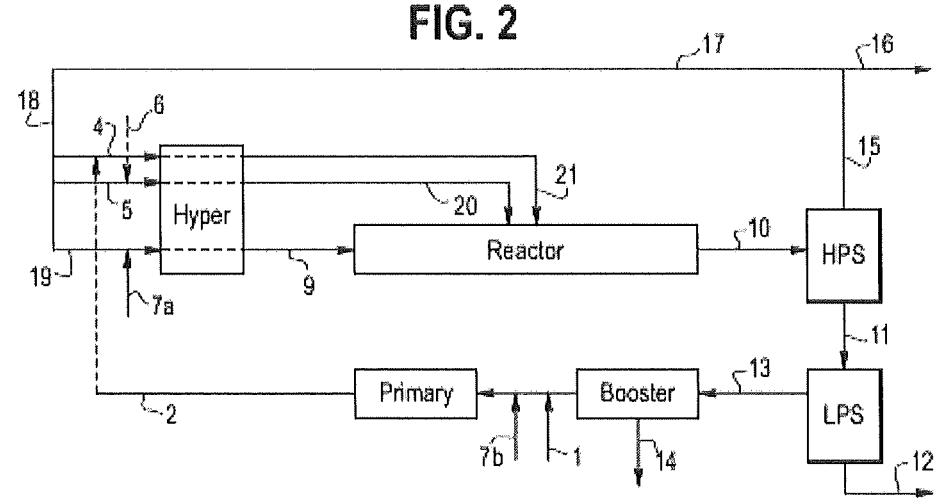
FIG. 2 is a process flow diagram for C.Ex. 15.

FIG. 2 shows the flow scheme of the high pressure polymerization process with a tubular reactor for Comp. Ex. 15. Stream (1), make-up ethylene, is compressed together with the outlet of the Booster by Primary compressor system resulting in flow (2). Stream (2) is fed together with additional ethylene from the high pressure recycle stream (18), through line 4, to the Hyper compressor part feeding the side stream (21) of the Reactor. The Hyper compressor part feeding the front stream (9) receives ethylene feed through line (19) from the high pressure recycle stream (18). The Hyper compressor part feeding the side stream (20) receives ethylene feed from the high pressure recycle stream (18). The make-up CTA system can be fed through Line (7a) and Line (7b). For distribution of the make-up CTA over line (7a) and (7b) influences the CTA conc. in the reactor zones, see Table 6.

Description of Flow Diagram Used for C.Exs. 16-18 and I.Ex. 2—

Figure 3:
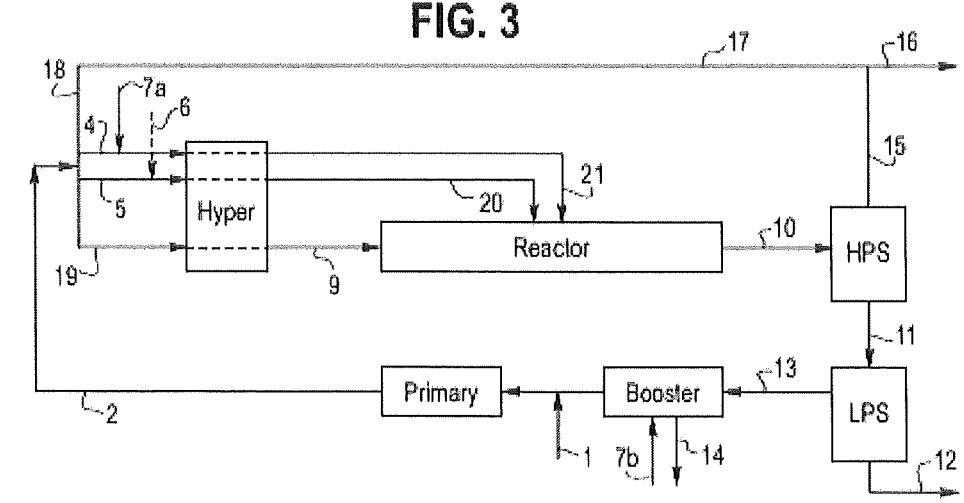
FIG. 3 is a flow diagram for C.Exs. 16, 17 and 18 and I.Ex. 2.

FIG. 3 shows the flow scheme used to produce C.Exs. 16-18 and I.Ex. 2. Stream (1) make-up ethylene is compressed together with the outlet of the Booster by Primary compressor system resulting in flow (2). Stream (2) is fed together with additional ethylene from the high pressure recycle stream (18) through line (5) and line (19) to the Hyper compressor parts feeding respectively the side stream (20) and the stream (9) of the Reactor. The Hyper compressor part feeding the side stream (21) receives ethylene feed through line (4) from the high pressure recycle stream (18). The make-up CTA system can be fed through Line (7a) and Line (7b). The distribution of the make-up CTA over line (7a) and (7b) influences the CTA concentration in the reactor zones. Stream (6) depicts the polyene feed. See Table 5.

Description of Flow Diagram Used for C.Exs. 19-20 and I.Exs. 3-4—

Figure 4:
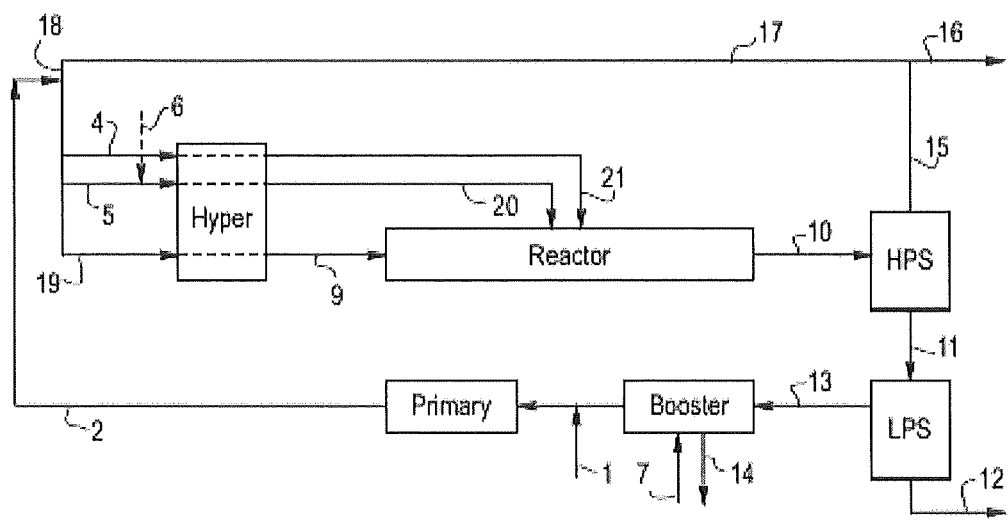
FIG. 4 is a flow diagram for C.Exs. 19 and 20 and I.Exs. 3 and 4.

FIG. 4 shows the flow scheme used to produce C.Exs. 19 and 20 and I.Exs. 3 and 4. Stream (1), make-up ethylene, is compressed together with the outlet of the Booster by Primary compressor system resulting in flow (2). Stream (2) is fed together with the ethylene from the high pressure recycle stream (19) through lines (19), (5) and (4), to the Hyper compressor parts compressing respectively the front stream (9) and the sides streams (20) and (21) of the Reactor. Stream (6) depicts the polyene feed. The CTA is fed through line (7) to the Booster. Optionally, the CTA can be fed to the inlet, interstages or outlet of the Primary or in line (18). See Table 5.

General Polymerization Conditions Used in C.Exs. 11-20 and I.Exs. 1-4—

In C.Exs. 11-20 and E.Exs. 1-4, the CTA concentration is adjusted to achieve a product with a melt index ($I_2$) of 4 g/10 min. Variation in product melt index is possible by lowering or increasing the CTA concentration.

Reactor and Feed Configurations Used in C.Exs. 11-20 and I.Exs. 1-4—

Figure 9:
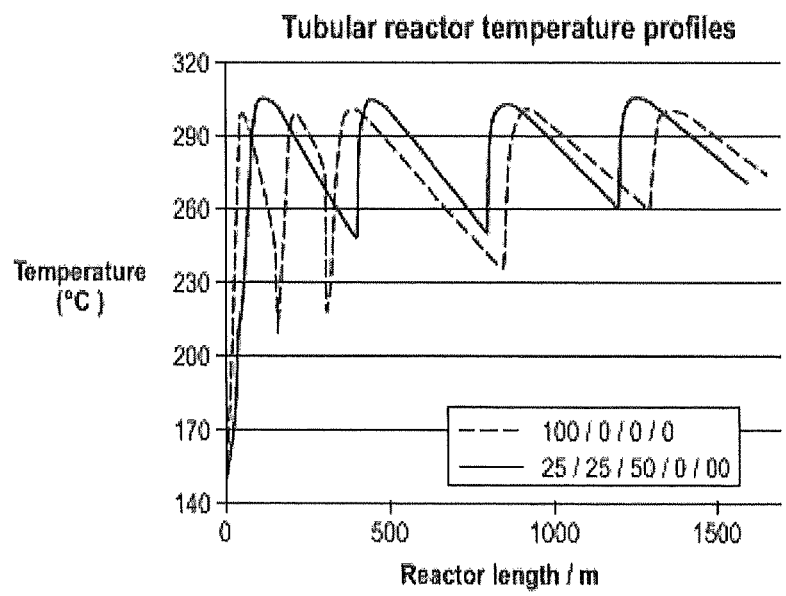
FIG. 9 depicts temp. profiles for tubular reactors with 100/0/0/0 and 25/25/50/0/0 ethylene distributions.

Table 5 shows the reactor configuration (i.e., dimensions, lay-out, applied ethylene feed distribution) used for the simulated comparative and inventive polymerizations. The type and distribution of polyenes are shown in Table 6. The feed distributions show the percent of total ethylene or polyene feed stream fed to each reaction zone. The notation "100/0/0/0" means that all the total ethylene or polyene feed is fed to the first reaction zone, while no make-up feed streams are fed to the second, third and fourth reaction zones. The ethylene or polyene received in the second, third and fourth reaction zones are carry-over from the previous reaction zones. Likewise the notation "25/25/50/0/0" means that 25% of the total ethylene or polyene feed is fed to the first and second reaction zones and 50% of the total ethylene or polyene feed is fed to the third reaction zone, while no make-up feed streams are fed to the fourth and fifth reaction zones. The ethylene or polyene received in the 4th and 5th reaction zone is carry-over from previous reaction zones. Further columns in Table 5 give information on pressure level and start temperature at the inlet of the first reaction zone, the ethylene feed temperature when a side ethylene feed stream is applied, and the maximum or peak temperatures in each reaction zone (Rx). The ethylene feed temperature can be optionally lowered and/or controlled with a cooler. The reactor temperature profiles are given in FIG. 9 for respectively the 100/0/0/0 and 25/25/50/0/0 ethylene feed configurations. In these diagrams, all reaction zones have one cooling section; however, multiple cooling sections, with counter- or co-current heat transfer media, operating at differentiated inlet temperatures may be used. Different cooling and/or heating media can be applied for the reactor cooling and/or preheating sections. The cooling/heating media comprise water, pressurized water (temperature level can be varied), condensate, boiling condensate, etc. The temperature of the cooling media is typically in the range of 0 to 220° C., while the temperature for preheating services is typically in the range of 100 to 250° C. The cooling/heating is applied through jackets around the high pressure tubes by co-current or counter-current flow. In the simulations the cooling/preheating was applied by counter-current and with one cooling section per reaction zone.

C.Exs. 11 and 12

Show simulations with different CTAs, respectively isobutane and PA, without feeding branching agent. All make-up CTA is fed together with the ethylene feed to the front of reactor. The ratio in CTA concentration inlet/outlet (Z1/Zi) is 1. The process conditions are shown in Table 5, while the predicted branching and conversion levels are shown in Table 6. The branching, SCB and LCB, and con-version levels are quite similar, except of small variations in the SCB levels caused by the high molar concentration of isobutane needed, resulting in lower effective ethylene concentration in the reactor by which the SBC reaction is promoted over the propagation reaction in case of isobutane as CIA. The predicted LCB levels do not indicate a difference in MWD for both comparative polymers; however data on C.Exs. 1', 2' and 3', produced at similar process conditions (see Tables 7 and 8), except of type and distribution of CTA, show that using a low active CTA as isobutane and/or distributing the CTA more to the back of reactor (Z1/Zi below 1) broadens the MWD as indicated by the G' data in Table 11. It can be concluded, that C.Ex. 11, made with isobutane as CTA, has higher a G' value than C.Ex. 12 made with propionaldehyde as CTA despite the comparable LCB levels. This means that when applying a branching agent to achieve a targeted higher level of G', less branching agent needs to be fed, incorporated and converted to H-branches when isobutane is used versus the case that propionaldehyde is used as CTA. A lower quantity of branching agent to be fed, in order to reach a lower level of H-branches in polymer, means lower cost and less risk of respectively reactor instability and fouling and gel formation in polymer.

C.Exs. 13 and 14

Show simulations at similar process conditions using respectively symmetrical bi-acrylate and HC-diene as branching agent. Due to the same process conditions and the same distribution and type (isobutane) of CTA the starting MWD, G' and ME before adding the branching agent will be similar. The process conditions are shown in Table 5, while the predicted branching and conversion levels are shown in Table 6. To reach the desired MWD, ME or G' values the same level of H-branches has to be formed in the polymer. The conversion level to H-branches for symmetrical bi-acrylate and HC-diene of respectively 99.4% and 22.2% show that at a molar scale about 4.5 times more HC-diene has to be fed versus symmetrical bi-acrylate to reach a similar H-branch level and that the polymer will contain a high level of residual HC-diene due to the incorporation level of 59.3% versus the almost complete incorporation of 99.99% for symmetrical bi-acrylate. I.Ex. 1 is made at the same process condition like C.Ex. 11. To increase G', the mCTA, as in Table 3, is added; mCTA is only adding T-branches to the molecular structure, and therefore a higher amount of T-branches per 1000 carbons is needed compare to the T-branch levels for C.Exs. 13 and 14. The incorporation level is with 99.6% high due to the high comonomer reactivity but due to the low CTA-reactivity only 14.3% of the mCTA be converted to T-branches. The higher level of T-branches needed and the low conversion rate to T-branches causes 74 times higher molar consumption of the mCTA compared to the symmetrical bi-acrylate. C.Exs. 15 and 16—Show simulations for reactor configuration with two ethylene side feed streams and an ethylene feed distribution of 25/25/50/0/0 over the five reaction zones. Propionaldehyde is used as CTA with different distributions (Z1/Zi) of respectively 1.33 and 0.067 for C.Exs. 15 and 16. The process conditions are shown in Table 5, while the predicted branching (LCB and SCB) and conversion levels are shown in Table 6. As learn from C.Exs. 2' and 3', these different CTA feed distributions will strongly affect the G' value. C.Ex. 12 with a Z1/Zi value of 1.33 will result a narrower MWD product with lower G' value and therefore more branching agent is needed to reach target G' values needed for e.g. extrusion coating product performance. On the other hand C.Ex. 13 using propionaldehyde as CTA with a distribution of the CTA more to back of the reactor will allow production of broader MWD product with higher G' value, despite the use of a high active CTA. C.Ex. 17—Shows simulations for reactor configuration with two ethylene side feed streams and an ethylene feed distribution of 25/25/50/0/0 over the five reaction zones. Propylene is used as CTA with a distribution (Z1/Zi) of 0.67. The process conditions are shown in Table 5, while the predicted branching (LCB and SCB) and conversion levels are shown in Table 6. C.Ex. 17 uses propylene as CTA with a distribution of the propylene more to back of the reactor will allow, when applying a branching agent production of broad MWD product with high G' values, with lower feed quantities of branching agent and H-branch level formed despite the use of a CTA with increased chain transfer activity. C.Ex. 18—The same process conditions as in C.Ex. 16. In addition the symmetrical bi-acrylate is added to increase G'. I.Ex. 2—The same process conditions are used as C. Ex. 18. Instead of adding the symmetrical bi-acrylate, the mCTA is added to increase G'. C.Ex. 19—Isobutane is used as CTA, and is even distributed (Z1/Zi=1); to increase G' HC-diene is added. I.Ex. 3—Isobutane is used as CTA and is even distributed (Z1/$Z_i$=1); to increase G' the mCTA is added. C.Ex. 20—Isobutane is used as CTA and is even distributed (Z1/Zi=1); to increase G' the symmetrical bi-acrylate is added. I.Ex. 4—Isobutane is used as CTA and is even distributed (Z1/Zi=1); to increase G' a mixture of the mCTA and the symm. bi-acrylate is added. Table 6 shows the simulated levels of ethylene and polyene (branching agent) conversion, the SCB and LCB frequency in polymer, and the conversion level of mCTA and/or polyene into H-branches and/or T-branches. Symmetrical bi-acrylate polyene gives almost complete incorporation and conversion to H-branches in the polymer. Symmetrical bi-acrylate allows shifting the symmetrical bi-acrylate distribution from the front to the 2nd and 3rd reaction zones, with minor impact on the symmetrical bi-acrylate incorporation level and conversion level to II-branches. This allows for a more homogeneous distribution of H-branch formation in the more polymer. Even distribution of symmetrical bi-acrylate with ethylene feed streams, as simulated in Comparative 13, 18 and 20, leads to strongly varying build-in levels and H-branch levels in the polymer, since the make-up symmetrical bi-acrylate will be rapidly incorporated and depleted in a reaction zone, by which the symmetrical bi-acrylate concentration will be either diluted or starved in the next reaction zone(s). Lowering needed H-branch level and/or better distributing the 11-branch level over the polymer is desirable from cost perspective, as well as lowering the potential of gel formation due to cross-linking by localized inter and intra-molecular H-branch formation. Application of a HC-diene, as shown by C.Exs. 14 and 19, gives lower incorporation levels and strongly reduced conversion to H-branches. For these types of polyenes, it becomes desirable to feed the polyene in the front reaction zones, to maximize incorporation level and conversion to H-branches, as shown in the inv. examples. The lower conversion levels to H-branches for HC-diene versus symmetrical bi-acrylate, imply that the molar feed of HC-diene versus symmetrical bi-acrylate for achieving an H-branch level 0.1/1000 C should be, respectively, a factor 4 and 3 higher for a 100/0/0/0 and 25/25/50/0/0 ethylene process configuration. Furthermore, the use of a HC-diene leads to a high residual free polyene level in the polymer. Use of a mCTA, as shown by I.Exs. 1 and 2, gives the desired level of T-branches or additional long chain branches, while avoiding cross-linking and gel formation in the polymer. The selected mCTA gives a good incorporation level, although the overall consumption level and applied concentration level is high, due to the low conversion levels to T-branches of, respectively, 14.3, 18.3 and 18.3% for, respectively, I.Exs. 1, 2 and 3. The molar consumption of mCTA vs. a polyene is affected by the lower impact of a T- or long chain branch versus a H-branch on rheology, and additionally by the lower conversion to a T-branch. The combined effect could lead to 50 times or higher molar consumption level for a mCTA vs. a polyene. Selection of a high active CTA, in combination with distributing the CTA more to the front of the reactor, would further increase the consumption of the mCTA, resulting in even higher costs and higher residual level in the polymer. Combining a favorable CTA selection and distribution, with a combination of mCTA and polyene, as shown in I.Ex. 4, is an effective to reduce the consumption of the mCTA, as well as reducing negative side effects by usage of a polyene, alone, to achieve a desired rheology.

TABLE 5

Reactor Configurations, Feed Modes, Process Conditions and CTAs Used

| | # of Rx-zones # | Ethylene feed distrib. over Rx-zones % mass of ethylene | Reactor inlet press. bar | Start temp. in Rx-zone 1° C. | Temp. of Ethylene side feed ° C. | Peak temp in Rx-zones ° C. | CTA | Ratio CTA conc. Z1/Zi |
|---|---|---|---|---|---|---|---|---|
| C. Exs. 11-14 and I. Ex. 1: Inside tube diameter (60 mm) and Rx-zon length (distribution): 1600 m (400-400-400-400) | | | | | | | | |
| C. Ex. 11 | 4 | 100/0/0/0 | 2500 | 150 | | 4 * 305 | isobutane | 1 |
| C. Ex. 12 | 4 | 100/0/0/0 | 2500 | 150 | | 4 * 305 | PA | 1 |
| C. Ex. 13 | 4 | 100/0/0/0 | 2500 | 150 | | 4 * 305 | isobutane | 1 |

TABLE 5-continued

Reactor Configurations, Feed Modes, Process Conditions and CTAs Used

| | # of Rx-zones # | Ethylene feed distrib. over Rx-zones % mass of ethylene | Reactor inlet press. bar | Start temp. in Rx-zone 1° C. | Temp. of Ethylene side feed ° C. | Peak temp in Rx-zones ° C. | CTA | Ratio CTA conc. Z1/Zi |
|---|---|---|---|---|---|---|---|---|
| C. Ex. 14 | 5 | 100/0/0/0 | 2500 | 150 | | 4 * 305 | isobutane | 1 |
| I. Ex. 1 | 4 | 100/0/0/0 | 2500 | 150 | | 4 * 305 | isobutane | 1 |
| C. Exs. 15-20 and I. Exs. 2-4: tube i.d. 35-50-60-60-60 mm and Rx-zone length (distrib.): 1700 m (150-150-500-500-400) | | | | | | | | |
| C. Ex. 15 | 5 | 25/25/50/0/0 | 2500 | 150 | 80 | 5 * 300 | PA | 1.33 |
| C. Ex. 16 | 5 | 25/25/50/0/0 | 2500 | 150 | 80 | 5 * 300 | PA | 0.67 |
| C. Ex. 17 | 5 | 25/25/50/0/0 | 2500 | 150 | 80 | 5 * 300 | Propylene | 0.67 |
| C. Ex. 18 | 5 | 25/25/50/0/0 | 2500 | 150 | 80 | 5 * 300 | PA | 0.67 |
| I. Ex. 2 | 5 | 25/25/50/0/0 | 2500 | 150 | 80 | 5 * 300 | PA | 0.67 |
| C. Ex. 19 | 5 | 25/25/50/0/0 | 2500 | 150 | 80 | 5 * 300 | isobutane | 1 |
| I. Ex. 3 | 5 | 25/25/50/0/0 | 2500 | 150 | 80 | 5 * 300 | isobutane | 1 |
| C. Ex. 20 | 5 | 25/25/50/0/0 | 2500 | 150 | 80 | 5 * 300 | isobutane | 1 |
| I. Ex. 4 | 5 | 25/25/50/0/0 | 2500 | 150 | 80 | 5 * 300 | isobutane | 1 |

*Isobutane (CTA) has a Cs, at 130° C. and 1360 atm, of 0.0072
**C. Ex. = Comp. Example; I. Ex. = Inv. Example
C. Exs. 11-20 and I. Exs. 1-4 are each a simulated comparative example.

TABLE 6

Type and Distrib. of Polyenes and Predicted Incorporation, Conversions and Branching Levels

| | BA feed distrib. wt % | LCB #/1000 C | SCB #/1000 C | Conv wt % | Incorp. Level % | Conv. to H (or T) % | H (or T) branch level #/1000 C | Total LCB (or T) |
|---|---|---|---|---|---|---|---|---|
| C. Exs. 11-12 and I. Exs. 1-3: tube i.d. (60 mm) and Rx-zone length (distribution): 1600 m (400-400-400-400) | | | | | | | | |
| C. Ex. 11 | none | 4.6 ± 0.1 | | 27.3 | 35.3 | | | |
| C. Ex. 12 | none | 4.6 ± 0.1 | | 26 | 35.9 | | | |
| C. Ex. 13 | Symm. bi-acrylate | 100/0/0/0 | 4.6 ± 0.1 | 27 | 36.3 | 99.99 | 99.4 | 0.094 | 4.6 |
| C. Ex. 14 | HC-diene | 100/0/0/0 | 4.6 ± 0.1 | 25.9 | 36.4 | 59.3 | 22.2 | 0.075 | 4.6 |
| I. Ex. 1 | Mono. CTA | 100/0/0/0 | 4.6 ± 0.1 | 28.6 | 36.8 | 99.6 | (14.3) | (1.0) | 5.6 |
| C. Exs. 13-15 and I. Exs. 4-7: tube i.d. 35-50-60-60-60 mm and Rx-zone length (distrib.): 1700 m (150-150-500-500-400) | | | | | | | | |
| C. Ex. 15 | none | | 4.7 ± 0.1 | 25.6 ± 0.2 | 37.3 | | | |
| C. Ex. 16 | none | | 4.7 ± 0.1 | 25.6 ± 0.2 | 36.5 | | | |
| C. Ex. 17 | none | | 4.7 ± 0.1 | 29.5 ± 0.2 | 36.3 | | | |
| C. Ex. 18 | Symm. bi-acrylate | 25/25/50/0/0 | 4.7 ± 0.1 | 25.6 ± 0.2 | 37.4 | 99.99 | 99.2 | 0.102 | 4.7 |
| I. Ex. 2 | Mono. CTA | 50/50/0/0/0 | 4.7 ± 0.1 | 25.6 ± 0.2 | 37 | 99.9 | (18.3) | (1.0) | 5.7 |
| C. Ex. 19 | HC-diene | 50/50/0/0/0 | 4.7 ± 0.1 | 25.6 ± 0.2 | 38.3 | 70.8 | 30.2 | 0.105 | 4.7 |
| I. Ex. 3 | Mono. CTA | 50/50/0/0/0 | 4.7 ± 0.1 | 25.6 ± 0.2 | 37 | 99.9 | (18.3) | 1.0 | 5.7 |
| C. Ex. 20 | Symm. bi-acrylate | 25/25/50/0/0 | 4.7 ± 0.1 | 25.6 ± 0.2 | 37.4 | 99.99 | 99.2 | 0.051 | 4.7 |
| I. Ex. 4 | Symm. bi-acrylate + (mono. CTA) | 25/25/50/0/0 (50/50/0/0/0) | 4.7 ± 0.1 | 25.6 ± 0.2 | 37.4 | 99.99 (99.9) | 99.2 (18.3) | 0.051 + (0.5) | 5.2 |

C. Exs. 11-20 and I. Exs. 1-4 are each a simulated comparative example.

Study 2-Actual Polymerizations (C.Ex. 1'-C.Ex. 10')

For the actual polymerizations, each polymerization was carried out in a tubular reactor with three reaction zones. Organic peroxides (see Table 7) were fed into each reaction zone. In each reaction zone, pressurized water was used for cooling and/or heating the reaction medium by circulating this water through the jacket of the reactor. Each reaction zone had one inlet and one outlet. Each inlet stream consisted of the outlet stream from the previous reaction zone and/or an added ethylene-rich feed stream. The non-converted ethylene and other gaseous components in the reactor outlet were recycled through a high pressure recycle and a low pressure recycle, and were compressed and distributed through the Booster, Primary and Hyper (secondary) compressor systems, according to flow scheme data shown in FIG. 6. The polymer was extruded and pelletized (about 30 pellets per gram) using a single screw extruder.

TABLE 7

| | Initiators | |
|---|---|---|
| Initiator | Abbreviation | Used in Rx-zone 1/2/3 |
| tert-Butyl peroxy-2-ethyl hexanoate | TBPO | yes/yes/no |
| Di-tert-butyl peroxide | DTBP | yes/yes/yes |

Description and Synthesis of Asymmetrical Diene Poly (Propylene Glycol) Allyl Ether Meth-Acrylate (PPG-AEMA) Used in C.Exs. 4', 5', 6', 7' and 9' as Branching Agent in the Actual Polymerizations:

All methacrylate monomers were prepared in accordance with the method of Ex. 1 in U.S. Pat. No. 4,916,255. In this case, XUS-13402.00, a polyglycol from The Dow Chemical Company was used to make the poly(propylene glycol) allyl ether methacrylate. The polymerization was carried out in tubular reactor with 3 reaction zones, as discussed above for C.Ex. 1'. All process conditions are the same as for C.Ex. 1', except the rheology modifier (PPG-AEMA=Polypropylene glycol allyl ether methacrylate (asymmetric diene)) was added via stream #7 and #6. See Tables 7-9. The structure and additional properties for PPG-AEMA can be found below:

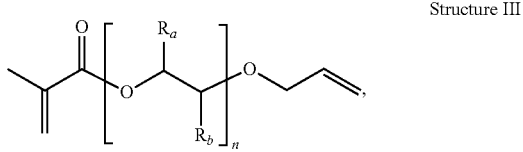

Structure III

Mn of about 280 g/mole; n from about 1 to about 10; isomeric oligomeric mixture, for each n, Ra=H and Rb=CH3, and Ra=CH3 and Rb=H).

Description of Flow Diagram Used for C.Exs. 2' and 7'—

Figure 5:
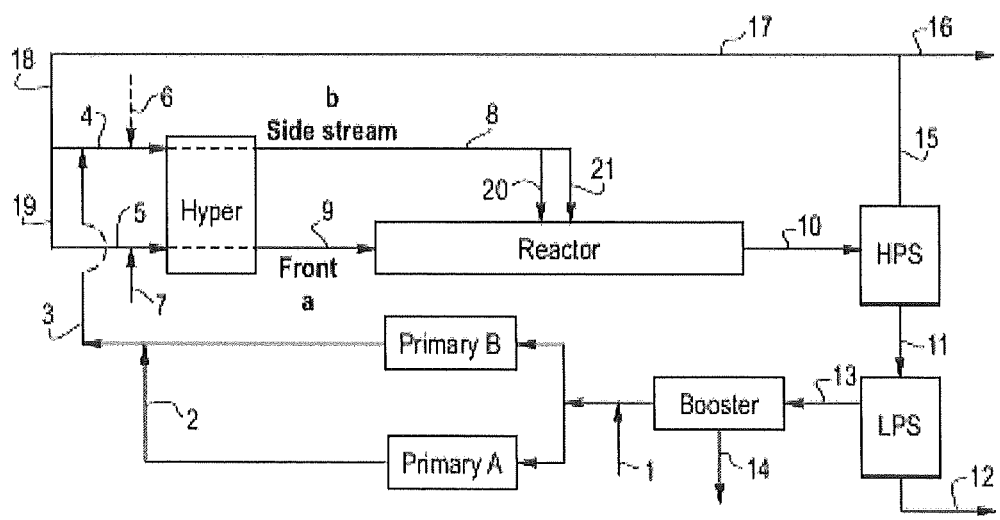
FIG. 5 is a flow diagram for C.Exs. 2' and 7'.

FIG. 5 shows the flow of the polymerization with a tubular reactor for C.Exs. 2' and 7'. Stream (1), make-up ethylene make-up, is compressed together with the outlet of the Booster by Primary compressor system resulting in flow (3) and (2). Stream (3) is fed together with additional ethylene from the high pressure recycle stream (19) through line (4) to the Hyper compressor part feeding the side (8) of the Reactor. The ethylene supplied by line (8) is distributed through line (20) and (21) to the side of the reactor. The Hyper compressor part feeding the front stream (9) receives ethylene feed through line (19) and (5) from the high pressure recycle stream (19). Line (6) and Line (7) depict lines for feeding separately CTA and branching agent to respectively line (4) and line (5).

Description of Flow Diagram Used for C.Exs. 1', 4', 6', 8' and 9'—

Figure 6:
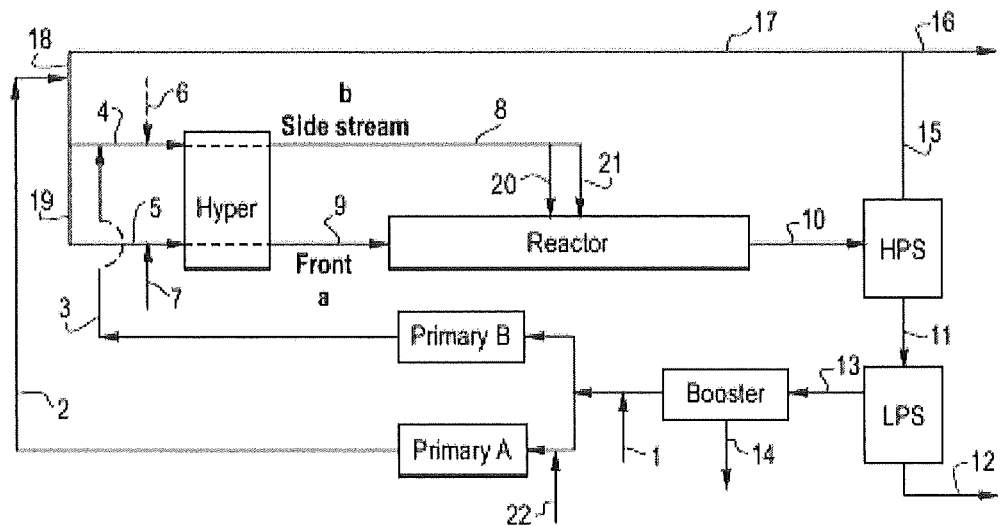
FIG. 6 is a flow diagram for C.Exs. 1', 4', 6', 8' and 9'.

FIG. 6 shows the flow scheme of the polymerization with a tubular reactor for C.Exs. 1', 4', 6', 8' and 9'. Stream (1), make-up ethylene make-up, is compressed together with the outlet of the Booster by two parallel Primary compressors A+B, both have similar capacity, resulting in flow (2) and flow (3). CTA is added through (22) to the feed of Primary compressor A. Stream (2) is combined with high pressure recycle stream (18), and distributed over flow (4) and flow (19). The Hyper compressor part feeding the front (9) of the reactor, receives from line (18) ethylene feed through line (19) and line (5). The Hyper compressor part feeding the side stream (8) receives ethylene feed through line (4). The ethylene supplied by line (8) is distributed through line (20) and (21) to the side of the reactor. Line (4) receives ethylene feed from line (3) and additional ethylene from line (18). The Hyper pressurizes the ethylene feed streams to a level sufficient to feed the high pressure tubular reactor (Reactor). Stream (6) and/or stream (7) depict the polyene feed.

Description of Flow Diagram Used for C.Exs. 3' and 5'—

Figure 7:
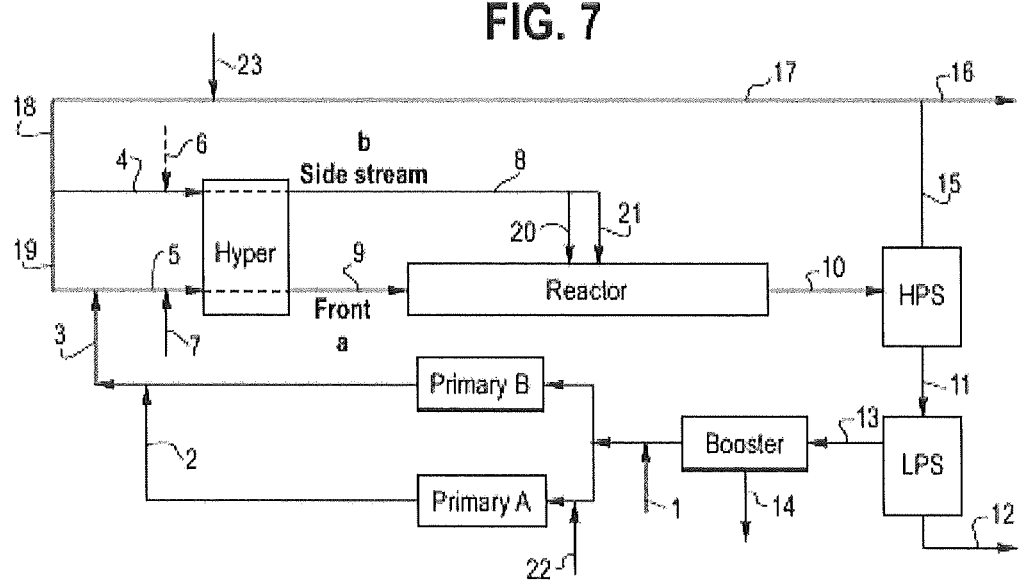
FIG. 7 is a flow diagram for C.Exs. 3' and 5'.

FIG. 7 shows the flow scheme of the polymerization with a tubular reactor for C.Exs. 3' and 5'. Stream (1), make-up ethylene make-up, is compressed together with the outlet of the Booster by Primary compressor system resulting in flow (3). Stream (3) is combined with high pressure recycle stream (19) and fed through line (5) to the Hyper compressor part feeding the front (9) of the Reactor. The Hyper compressor part feeding the side stream (8) receives ethylene feed through line (4). The ethylene supplied by line (8) is distributed through line (20) and (21) to the side of the reactor. Line (4) receives ethylene feed from line (18). The CTA is fed through line (23). The Hyper pressurizes the ethylene feed streams to a level sufficient to feed the high pressure tubular reactor (Reactor). Stream (6) and/or stream (7) depict the polyene feed.

Description of Flow Diagram Used for C.Ex. 10'—

Figure 8:
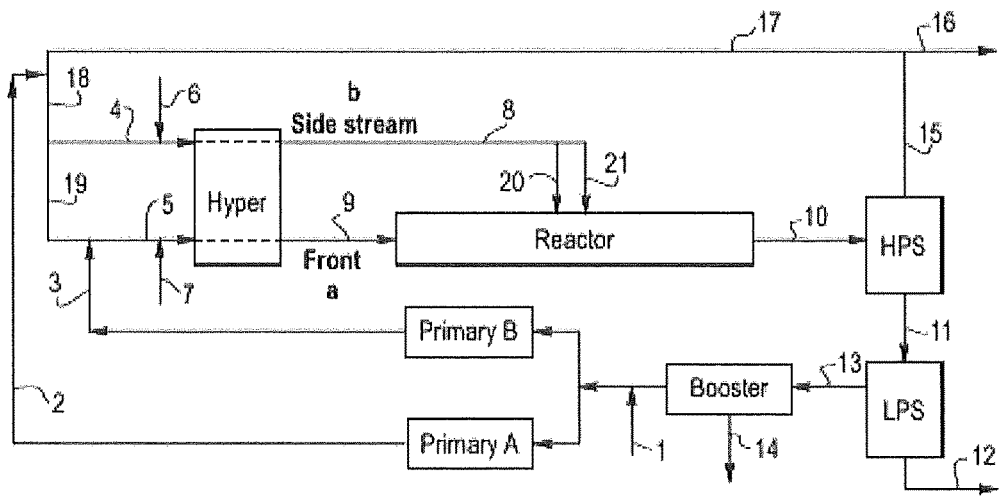
FIG. 8 is a flow diagram for C.Ex. 10'.

FIG. 8 shows the flow scheme of the polymerization with a tubular reactor for C.Ex. 10'. Stream (1), make-up ethylene make-up, is compressed together with the outlet of the Booster by Primary compressor B and A resulting in stream (3) and (2). Stream (3) is fed together with additional ethylene from the high pressure recycle stream (19) through line 5 to the Hyper compressor part feeding the front (9) of the Reactor. Stream (2) is combined with the high pressure recycle stream (17) resulting in stream (18). The Hyper part feeding the side stream (8) receives ethylene feed thru line (18) and (5). The ethylene supplied by line (8) is distributed through line (20) and (21) to the side of the reactor. Line (6) and Line (7) depict each separate lines for feeding separately CTA and branching agent to respectively line (4) and line (5).

C.Ex. 1' (Comparative Ethylene-Based Polymer Made with Isobutane)—

The polymerization was carried out in tubular reactor with three reaction zones (FIG. 6). The inlet-pressure was 2220 bar, and the pressure drop over the whole tubular reactor system was about 300 bar. Iso-butane was used as a chain transfer agent (CTA), and it was present in each reaction zone inlet, originating from the low pressure and high pressure recycle flows (#13 and #15), as well as from injected CTA make-up stream #22. The make-up ethylene is fed through stream #1. The polymer was extruded and pelletized (about 30 pellets per gram), using a single screw extruder, at a melt temperature around 230-250° C. The weight ratio of the ethylene-rich feed streams to the three reaction zones was 1.00:0.80:0.20. The internal process velocity was approximately 12.5, 9 and 11 m/sec for respectively the $1^{st}$, $2^{nd}$ and $3^{rd}$ reaction zones. C.Ex. 8' (Comparative Ethylene-based Polymer made with Propylene)— The polymerization was carried out in tubular reactor with three reaction zones, as for C.Ex. 1', except as CTA propylene was added via (22), and the inlet pressure of reaction zone 1 was lower. C.Ex. 9' (Comparative Ethylene-based Polymer made with Propylene and PPG-AEMA)—The polymerization was carried out in tubular reactor with three reaction zones, as for C.Ex. 8', except PPG-AEMA was added via stream #7 and #6. The amount can be found in Table 9. See also Tables 8 to 11.

C.Ex. 2' (Comparative Ethylene-Based Polymer Made with PA)

The polymerization was carried out in tubular reactor with three reaction zones (FIG. 5). This configuration leads to the highest ratios of CTA conc. in the front ethylene-based feed versus the concentrations of CTA in sequential ethylene-based feed streams. The weight ratio of the ethylene-rich feed streams to the three reaction zones was 1.00:0.60:0.40. For the CTA, propionaldehyde (PA) was used, and it was present in each reactor inlet, originating from the low and high pressure recycle flows (#13 and #15), as well as from injected CTA make-up stream 6 and 7. The make-up ethylene is fed through stream #1. C.Ex. 7' (Comparative Ethylene-based Polymer made with PA and PPG-AEMA)—The polymerization was carried out in tubular reactor with three reaction zones, as for C.Ex. 2', except of adding the rheology modifier. The rheology modifier was added like the CTA in suction of the Hyper in separated feed line like streams 6 and 7. See also Tables 8 to 11.

C.Ex. 3' (Comparative Ethylene-Based Polymer Made with PA)—

The polymerization was carried out in tubular reactor with three reaction zones (FIG. 7). This configuration leads to the lowest ratios of CTA concentration in the front ethylene-based feed vs. the conc. of CTA in sequential ethylene-based feed streams. While in C.Exs. 1', 2' and 4', the ratios of CTA conc. in the front ethylene-based feed versus the cones. of CTA in sequential ethylene-based feed streams were higher, and above 1. The weight ratio of the ethylene-rich feed streams to the three reaction zones was 1.00:0.60:0.40. For the CTA, PA was used, and it was present in each reactor inlet, originating from the low and high pressure recycle flows (#13 and #15), as well as from injected CTA make-up stream #23. The make-up ethylene is fed through stream #1. Like C.Ex. 1', the rheology modifier (PPG-AFMA) was added via stream #7 and #6. C.Ex. 5' (Comparative Ethylene-based Polymer made with PA and PPG-AEMA) The polymerization was carried out in tubular reactor with three reaction zones, as for C.Ex. 3', except of adding the rheology modifier.

C.Exs. 4' and 6' (Comp. Ethylene-Based Polymer Made with Isobutane and PPG-AEMA)—

The polymerization was carried out in tubular reactor with 3 reaction zones (FIG. 6). The inlet-pressure was 2220 bar, and the pressure drop over the reactor system was about 300 bars. Isobutane was the CTA, and it was present in each reaction zone inlet, originating from the low pressure and high pressure recycle flows (#13 and #15), as well as from injected CIA make-up stream #22. The make-up ethylene is fed through stream #1. PPG-AEMA was fed and distributed through line 6 and line 7—see Table 9. The polymer was extruded and pelletized (about 30 pellets per gram), using a single screw extruder, at a melt temperature around 230-250° C. The weight ratio of the ethylene-rich feed streams to the three reaction zones was 1.00:0.80:0.20. The internal process velocity was approximately 12.5, 9 and 11 m/sec for respectively the $1^{st}$, $2^{nd}$ and $3^{rd}$ rnx zones.

C.Ex. 10' (Comparative Ethylene-Based Polymer Made with Acetone)

The polymerization was in tubular reactor with 3 rnx. zones (FIG. 8). In addition to the mentioned peroxides (Table 7), the high temperature peroxide TRIGONOX 301 is added to reaction zones 1 and 2. The peak temperatures were 337/330/310° C., respectively. The wt ratio of the ethylene-rich feed streams to the 3 reaction zones was 1.00:0.75:0.25. The CTA, acetone, was present in each reactor inlet, originating from the low and high pressure recycle flows (#13 and #15), as well as from injected CTA make-up stream #7 and/or #6.

TABLE 8

Pressure and Temperature Conditions (Actual Data)

| Type | Inlet pressure bar | Start temp./° C. | reinitiation temp./° C. | reinitiation temp./° C. | 1st Peak temp./° C. | 2nd Peak temp./° C. | 3rd Peak temp./° C. |
|---|---|---|---|---|---|---|---|
| C. Ex. 1' | 2220 | 140 | 150 | 207 | 294 | 292 | 294 |
| C. Ex. 2' | 2150 | 145 | 152 | 196 | 293 | 293 | 293 |
| C. Ex. 3' | 2140 | 145 | 159 | 197 | 292 | 294 | 294 |
| C. Ex. 4' | 2220 | 144 | 148 | 211 | 293 | 293 | 293 |
| C. Ex. 5' | 2140 | 145 | 160 | 199 | 293 | 293 | 293 |
| C. Ex. 6' | 2220 | 140 | 148 | 213 | 294 | 293 | 294 |
| C. Ex. 7' | 2140 | 145 | 151 | 198 | 293 | 293 | 293 |
| C. Ex. 8' | 2155 | 145 | 148 | 217 | 293 | 293 | 294 |
| C. Ex. 9' | 2155 | 145 | 148 | 217 | 293 | 293 | 294 |
| C. Ex. 10' | 2100 | 140 | 157 | 246 | 337 | 330 | 310 |

C. Ex. 1'-C. Ex. 10' are each an actual comparative example.

Figure 10:
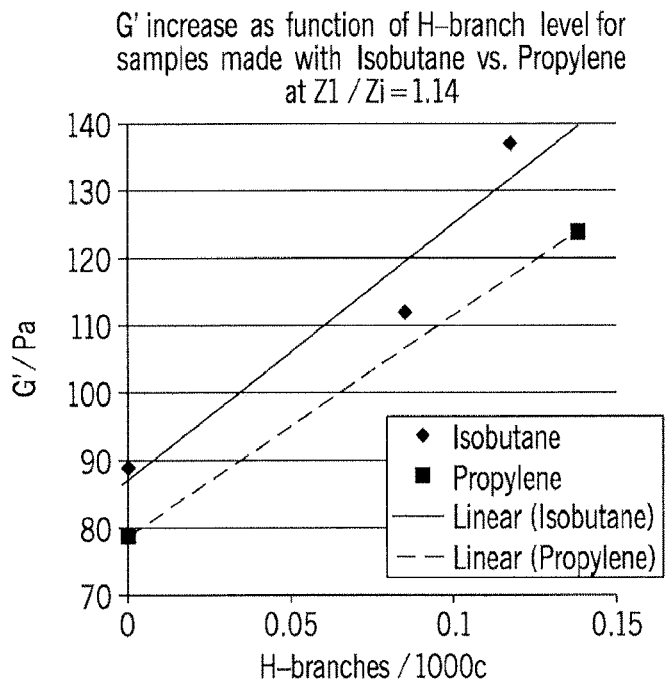
FIG. 10 depicts G' values as function of H-branch level when using isobutane or propylene as CTA.
Figure 11:
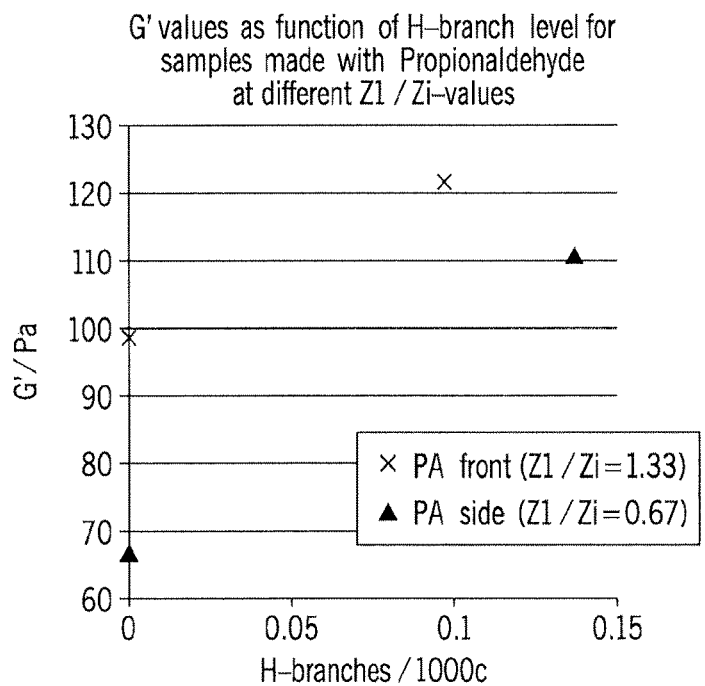
FIG. 11 depicts G' values as function of 14-branch level using PA with different feed distributions.

The comparison of the C.Exs. 1'-9' shows that the polyene (PPG-AFMA) is effective in increasing G', by formation of intermolecular branches. Iso-butane, as CTA, show the importance of the distribution of the rheology modifier over the reaction zones, to achieve a good balance of high G' values and low gel levels. Isobutane as CIA, vs. using propylene as CTA, shows the importance to reduce the CTA-activity at the inlet of the reactor and/or in the first reaction zone. Replacing isobutane by propylene resulted in lower densities, higher extractable levels and less effective use of the rheology modifier (FIG. 10). Surprisingly, using PA, as CTA, and distributing its concentration and activity to the subsequent reaction zones, led to an effective use (high G' levels, low gel levels, and/or low consumption of the modifier) of the modifier. FIG. 11 shows the influence of II-branch level with different distributions of PA CTA. Distributing the PA to the side of the reactor gives G' values, which are at least 20% higher vs. the distribution of PA to its front. The gel level was visually lower, despite the higher initial MW in the front of the reactor. Surprisingly, the formation of higher MW in the beginning of the reactor by the reduced CTA activity, and the formation of higher MW in the polymer, as indicated by higher G' values, does not lead to highest gel values. The final gel level is influenced by the starting (without branching agent) G' value for the polymer, the level of polyene needed to achieve desired G' level, and the distribution of the H-branch formation in the polymer. The gel level is reduced by a higher G' number for the reference polymer (no polyene), lower amount of polyene needed to reach the desired G' level, better distribution of the polyene over rnx. Zones, and a better distribution of HI-branch formation inter- and intra-molecules. C.Ex. 10' shows a polymerization in which no branching agent was used. The LCB level, see Table 10, was increased to a level that the desired rheology was achieved (Table 11). The polymer, with a calculated LCB level of 5.72 per 1000 C, has a G' value of 132 Pa, which exceeds the boundary value of 104 Pa for an 12 of 5. Based on this LCB level and the G' values for C.Exs. 1'-4' and 10, a minimum LCB content of 5 per 1000 C has been selected for achieving the desired rheology, as expressed by the G' relationship G'≥C+Dlog (12), where C=167 Pa, and D=−90.0 Pa/log(dg/min), when using no branching agent. When a mCTA is used, this min. LCB level of 5 per 1000 C can be reached by the sum of LCB level and T-branch level by the mCTA. So when the LCB level is 4 per 1000 C, an additional T-branch level of 1 per 1000 C should be formed in the polymer to ensure the desired rheological properties. C.Ex. 4' (3.6 LCB/1000 C and 0.117 H-branch/1000 C) in comparison with C.Ex. 10' (5.7 LCB/1000 C and 0 H-branch/1000 C) indicates that an H-branch is at least a factor of 10 more efficient for increasing G' than a LCB or T-branch.

TABLE 11

| | Polymer Properties | | | | |
|---|---|---|---|---|---|
| | Melt index g/dmin | Density g/cc | G' Pa | G' according Eqn Pa | GI-200 Unit = mm² Gel per 24.6 cm³ of film |
| C. Ex. 1' | 4 | 0.9243 | 89 | 112.8 | 0.7 |
| C. Ex. 2' | 4.36 | | 67 | 109.4 | |
| C. Ex. 3' | 4.14 | | 99 | 111.5 | |
| C. Ex. 4' | 3.9 | 0.9248 | 137 | 113.8 | 22.7 |
| C. Ex. 5' | 3.8 | 0.9258 | 122 | 114.8 | |
| C. Ex. 6' | 3.7 | 0.9243 | 112 | 115.9 | 56* |
| C. Ex. 7' | 3.8 | | 111 | 114.8 | |
| C. Ex. 8' | 4.28 | | 79 | 110.2 | |
| C. Ex. 9' | 4.1 | 0.9204 | 124 | 111.8 | |
| C. Ex. 10' | 5 | 0.9188 | 132 | 104.1 | ≤1 |

C. Ex. 1'-C. Ex. 10' are each an actual comparative example.
*Average of two cast film runs

The invention claimed is:
1. A process to form an ethylene-based polymer, said process comprising polymerizing a reaction mixture comprising ethylene, at least one monomeric chain transfer agent, at least one polyene, wherein a molar feed ratio of the monomeric chain transfer agent to the polyene is greater than or equal to 1.0, and at least one chain transfer agent system comprising at least one chain transfer agent, and wherein the polymerization takes place in the presence of at

TABLE 9

| | Additional Information (Actual Data) | | | | | | |
|---|---|---|---|---|---|---|---|
| | PPG-AEMA flow (kg of diene per hr) ($1^{st}/2^{nd}/3^{rd}$) | PPG-AEMA (mole ppm diene in ethylene-based feed stream in each mx zone**) ($1^{st}/2^{nd}/3^{rd}$) | CTA | Ratio CTA conc. 1st Rx-zone/last Rx-zone ($Z_1/Z_i$) | Ratio CTA conc. 1st Rx-zone/2nd Rx-zone | Total Hyper thru-put ton per hr | Polymer out-put ton per hr* |
| C. Ex. 1' | 0/0/0 | 0/0/0 | Isobutane | 1.14 | 1.14 | 54.2 | 15 |
| C. Ex. 2' | 0/0/0 | 0/0/0 | PA | 1.37 | 1.26 | 56.4 | 15.9 |
| C. Ex. 3' | 0/0/0 | 0/0/0 | PA | 0.61 | 0.68 | 56.1 | 15.8 |
| C. Ex. 4' | 38/18/5 | 142/86/86 | Isobutane | 1.14 | 1.14 | 54.2 | 14.9 |
| C. Ex. 5' | 10/37/25 | 34/219/219 | PA | 0.71 | 0.76 | 56.2 | 15.9 |
| C. Ex. 6' | 0/50/13 | 0/233/233 | Isobutane | 1.14 | 1.14 | 54.2 | 14.9 |
| C. Ex. 7' | 100/0/0 | 230/0/0 | PA | 1.37 | 1.25 | 56.3 | 15.8 |
| C. Ex. 8' | 0/0/0 | 0/0/0 | Propylene | 1.14 | 1.15 | 56.4 | 15.4 |
| C. Ex. 9' | 48/21/5 | 172/94/94 | Propylene | 1.14 | 1.14 | 56.4 | 15.5 |
| C. Ex. 10' | 0/0/0 | 0/0/0 | Acetone | 0.87 | 0.86 | 52.8 | 17.1 |

*Polymer output was calculated from ethylene (#1), CTA (#22 and/or #23) and PPG-AEMA (#6 and/or #7) intakes corrected for process purge stream (#16).
**Ethylene-based feed stream in each reaction zone refers to the feed stream compressed and fed by the hyper, and containing a majority amount of ethylene (e.g., >80 wt % ethylene). Other components, such as comonomer, CTA, peroxide dissociation products, solvent may be present.
C. Ex. 1'-C. Ex. 10' are each an actual comparative example.

TABLE 10

| | Results on Branching Levels and Conversions | | | | | |
|---|---|---|---|---|---|---|
| | SCB* #/1000 C | Methyl* #/1000 C | LCB* #/1000 C | PPG-AEMA conv.* % | Conversion to H-branch* % | H-branch level* #/1000 C |
| C. Ex. 1' | 26.5 | 0 | 3.74 | 0 | 0 | 0 |
| C. Ex. 2' | 25.1 | 0 | 3.69 | 0 | 0 | 0 |
| C. Ex. 3' | 25.5 | 0 | 3.74 | 0 | 0 | 0 |
| C. Ex. 4' | 25.7 | 0 | 3.62 | 98.2 | 57.6 | 0.117 |
| C. Ex. 5' | 25.1 | 0 | 3.64 | 94.7 | 42.9 | 0.097 |
| C. Ex. 6' | 25.8 | 0 | 3.66 | 95.4 | 42.7 | 0.085 |
| C. Ex. 7' | 24.8 | 0 | 3.56 | 99.9 | 67 | 0.137 |
| C. Ex. 8' | 25.8 | 4.7 | 3.68 | 0 | 0 | 0 |
| C. Ex. 9' | 25.5 | 2.2 | 3.67 | 98.1 | 57 | 0.138 |
| C. Ex. 10' | 29.3 | 0 | 5.72 | 0 | 0 | 0 |

C Ex. 1'-C. Ex. 10' are each an actual comparative example.
* Results obtained via modeling using the kinetics in Tables 2-4.

least one free-radical initiator; and wherein the polymerization takes place in a reactor configuration comprising at least two reaction zones, reaction zone 1 and reaction zone i (i≥2), wherein reaction zone i is downstream from reaction zone 1; and wherein the process comprises at least one of the following:
  (A) a ratio of "the activity of the CTA system of the feed to the first reaction zone" to the "activity of the CTA system of the cumulative feed to the reaction zone i," $(Z_1/Z_i)$, is less than or equal to $(0.8-0.2*\log(Cs))$, wherein Cs is from 0.0001 to 10; or
  (B) the chain transfer agent system has a Cs value at 130° C. and 1360 atmosphere of less than, or equal to 0.020; or
  (C) the ratio of CTA activity in the feeds to the first reaction zone and to reaction zone i $(Z_1/Z_i)$ is less than, or equal to, 0.90.

2. The process of claim 1, wherein the ethylene-based polymer has a G' value that meets the following relationship: G' (G"=500 Pa, 170° C.)≥C+Dlog(I$_2$), where C=170 Pa, and D=-90.0 Pa/log(dg/min), and a melt index (I2) from 1 to 20 g/10 min.

3. The process of claim 1, wherein the monomeric chain transfer agent is selected from formulas i) through vi):

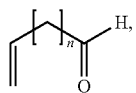

wherein n is from 2 to 20;

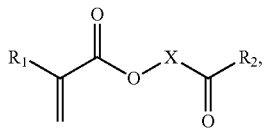

wherein $R_1$ and $R_2$ are each independently selected from H or an alkyl; and X is a $C_1$ to $C_{32}$ alkyl chain which is linear or branched;

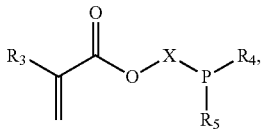

wherein $CR_3$, $R_4$ and $R_5$ are each independently selected from H or an alkyl; and X is a $C_3$ to $C_{20}$ alkyl chain which is linear or branched;

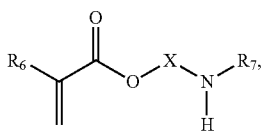

wherein $R_6$ and $R_7$ are each independently selected from H or an alkyl; and X is a $C_2$ to $C_{20}$ alkyl chain which is linear or branched;

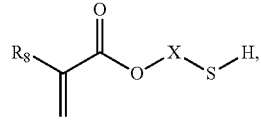

wherein $R_8$ is selected from H or an alkyl; and X is a $C_2$ to $C_{20}$ alkyl chain which is linear or branched; and

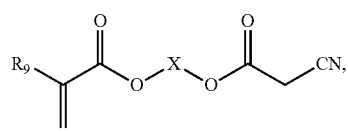

wherein $R_9$ is selected from H or an alkyl; and X is a $C_2$ to $C_{20}$ alkyl chain which is linear or branched.

4. The process of claim 1, wherein the polyene is a symmetrical polyene.

5. The process of claim 1, wherein the polyene is an asymmetrical polyene.

6. The process of claim 1 wherein the total ethylene based feed flow to the reactor configuration is from 30 to 400 tons per hr.

7. The process of claim 1, wherein the ethylene-based polymer further comprises one or more comonomers selected from α-olefins, vinyl acetates, acrylates, methacrylates, anhydrides and vinyl silanes, or combinations thereof.

8. A process to form an ethylene-based polymer, the ethylene-based polymer having a G' value that meets the following relationship: G' (G"=500 Pa, 170° C.)≥C+Dlog (I$_2$), where C=170 Pa, and D=-90.0 Pa/log(dg/min), and a melt index (I2) from 1 to 20 g/10 min, said process comprising polymerizing a reaction mixture comprising ethylene, at least one monomeric chain transfer agent, and at least one chain transfer agent system comprising at least one chain transfer agent, and wherein the polymerization takes place in the presence of at least one free-radical initiator; and wherein the polymerization takes place in a reactor configuration comprising at least two reaction zones, reaction zone 1 and reaction zone i (i≥2), wherein reaction zone i is downstream from reaction zone 1; and wherein the process comprises at least one of the following:
  (A) a ratio of "the activity of the CTA system of the feed to the first reaction zone" to the "activity of the CTA system of the cumulative feed to the reaction zone i," $(Z_1/Z_i)$, is less than or equal to $(0.8-0.2*\log(Cs))$, wherein Cs is from 0.0001 to 10; or
  (B) the chain transfer agent system has a Cs value at 130° C. and 1360 atmosphere of less than, or equal to 0.020; or
  (C) the ratio of CTA activity in the feeds to the first reaction zone and to reaction zone i $(Z_1/Z_i)$ is less than, or equal to, 0.90.

9. The process of claim 8, wherein the reaction mixture further comprises at least one polyene.

10. The process of claim 9, wherein the ethylene-based polymer comprises greater that 0.03 wt % of the polyene, based on the weight of the polymer.

11. The process of claim 8, wherein the monomeric chain transfer agent is selected from formulas i) through vi):

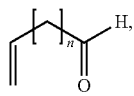   i)

wherein n is from 2 to 20;

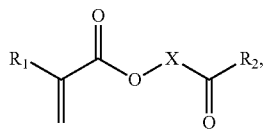   ii)

wherein $R_1$ and $R_2$ are each independently selected from H or an alkyl; and X is a $C_1$ to $C_{32}$ alkyl chain which is linear or branched;

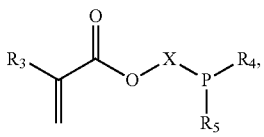   iii)

wherein $CR_3$, $R_4$ and $R_5$ are each independently selected from H or an alkyl; and X is a $C_3$ to $C_{20}$ alkyl chain which is linear or branched;

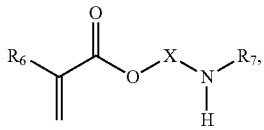   iv)

wherein $R_6$ and $R_7$ are each independently selected from H or an alkyl; and X is a $C_2$ to $C_{20}$ alkyl chain which is linear or branched;

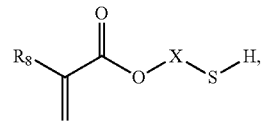   v)

wherein $R_8$ is selected from H or an alkyl; and X is a $C_2$ to $C_{20}$ alkyl chain which is linear or branched; and

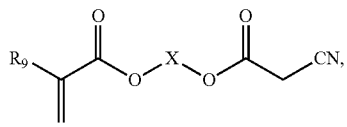   vi)

wherein $R_9$ is selected from H or an alkyl; and X is a $C_2$ to $C_{20}$ alkyl chain which is linear or branched.

12. The process of claim 9, wherein the polyene is a symmetrical polyene.

13. The process of claim 9, wherein the polyene is an asymmetrical polyene.

14. The process of claim 8 wherein the total ethylene based feed flow to the reactor configuration is from 30 to 400 tons per hr.

15. The process of claim 8, wherein the ethylene-based polymer further comprises one or more comonomers selected from α-olefins, vinyl acetates, acrylates, methacrylates, anhydrides and vinyl silanes, or combinations thereof.

16. The process of claim 8, wherein the ethylene-based polymer comprises from greater than, or equal to, 0.2 to less than, or equal to, 3.0 moles of "T-branches derived from the use of the monomeric chain transfer agent" per 1000 moles of carbon atoms incorporated into the ethylene-based polymer.

17. The process of claim 8, wherein the ethylene-based polymer contains greater than 0.3 moles of "T-branches derived from the use of the monomeric chain transfer agent" per 1000 moles of carbon atoms incorporated into the polymer and comprises less than 3.0 moles of "overall H-branches" per 1000 moles of carbon atoms incorporated into the polymer.

18. The process of claim 8, wherein the ethylene-based polymer comprises greater that 0.03 wt % of the polyene, based on the weight of the polymer.

19. The process of claim 8, wherein the ethylene-based polymer comprises from greater than, or equal to, 0.2 to less than, or equal to, 3.0 moles of "T-branches derived from the use of the monomeric chain transfer agent" per 1000 moles of carbon atoms incorporated into the ethylene-based polymer.

20. The process of claim 8, wherein the ethylene-based polymer contains greater than 0.3 moles of "T-branches derived from the use of the monomeric chain transfer agent" per 1000 moles of carbon atoms incorporated into the polymer and comprises less than 3.0 moles of "overall H-branches" per 1000 moles of carbon atoms incorporated into the polymer.

* * * * *